United States Patent [19]

Hamanaka et al.

[11] Patent Number: 5,712,713

[45] Date of Patent: Jan. 27, 1998

[54] IMAGE FORMING APPARATUS HAVING AUTOMATIC EDIT TIMING

[75] Inventors: Miki Hamanaka; Toshiharu Takahashi; Masako Shibaki, all of Kawasaki, Japan

[73] Assignee: Kabushiki Kaisha Toshiba, Kawasaki, Japan

[21] Appl. No.: 406,382

[22] Filed: Mar. 17, 1995

[30] Foreign Application Priority Data

Mar. 24, 1994 [JP] Japan .................................. 6-053848

[51] Int. Cl.⁶ ........................................ G06F 15/66
[52] U.S. Cl. ............................... 358/451; 358/452
[58] Field of Search ............................ 358/450–452; 355/55–56; 395/102

[56] References Cited

U.S. PATENT DOCUMENTS 4,398,222  8/1983  Ogawa ............................ 358/451
4,965,744  10/1990  Wagatsuma et al. ............ 358/452
5,627,660  5/1997  Kusano et al. ................... 395/102

Primary Examiner—Edward L. Coles, Sr.
Assistant Examiner—Stephen Brinich
Attorney, Agent, or Firm—Limbach & Limbach, LLP

[57] ABSTRACT

An image forming apparatus includes a scanner for scanning an image on a document, a memory for storing image data of the scanned image in a storage medium, a reading device for reading out the image data from the storage medium, and an image forming device for forming an image on an image formation medium. An instruction device instructs a time at which the edit process of the image data scanned by the scanner is executed, according to the content of a designated edit process. On the basis of the instruction, the edit process is executed when the image is stored in the storage medium, or when the image formation is performed by the image forming device. For example, the time at which the edit process is executed is determined in accordance with the possibility of a variable magnification process at a time of output based on the designated edit process and a variable magnification ratio designated by a designation device.

11 Claims, 24 Drawing Sheets

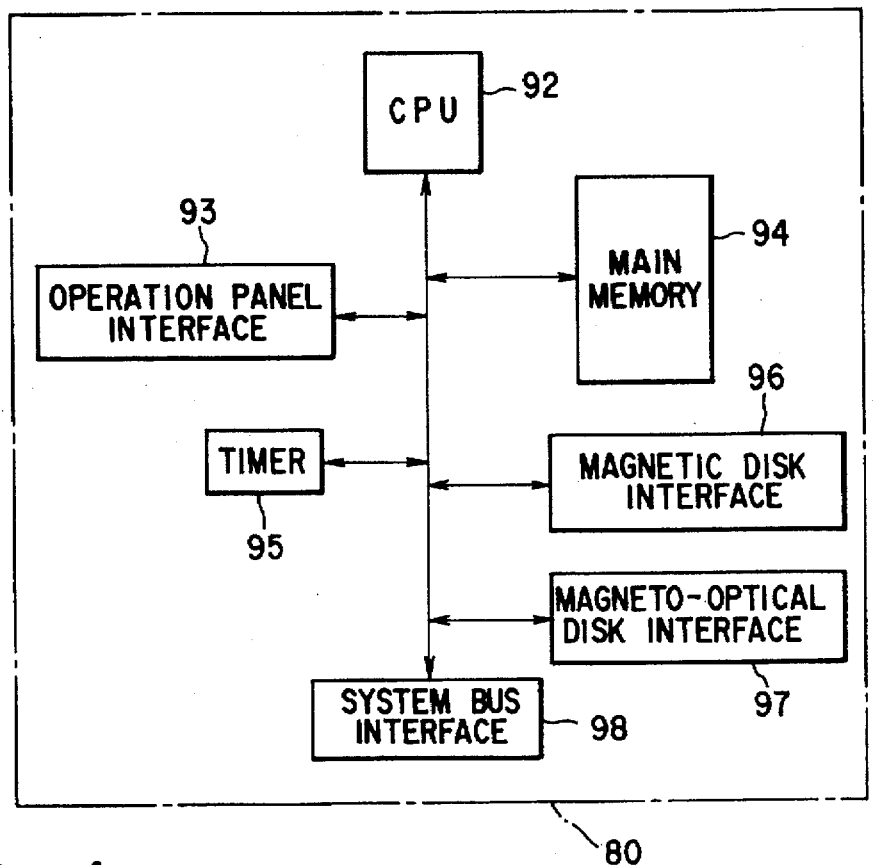
F I G. 4
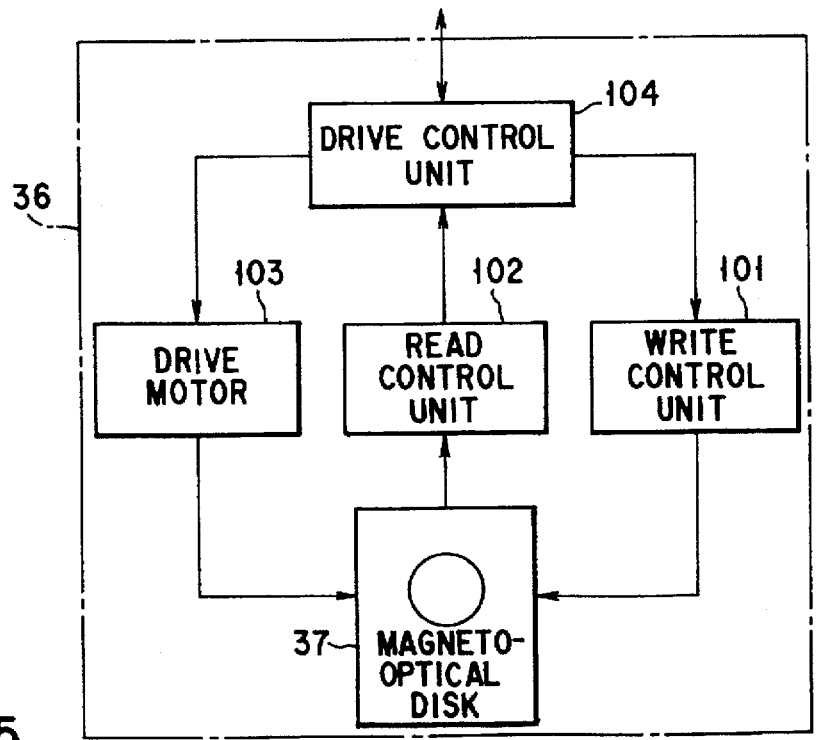
F I G. 5

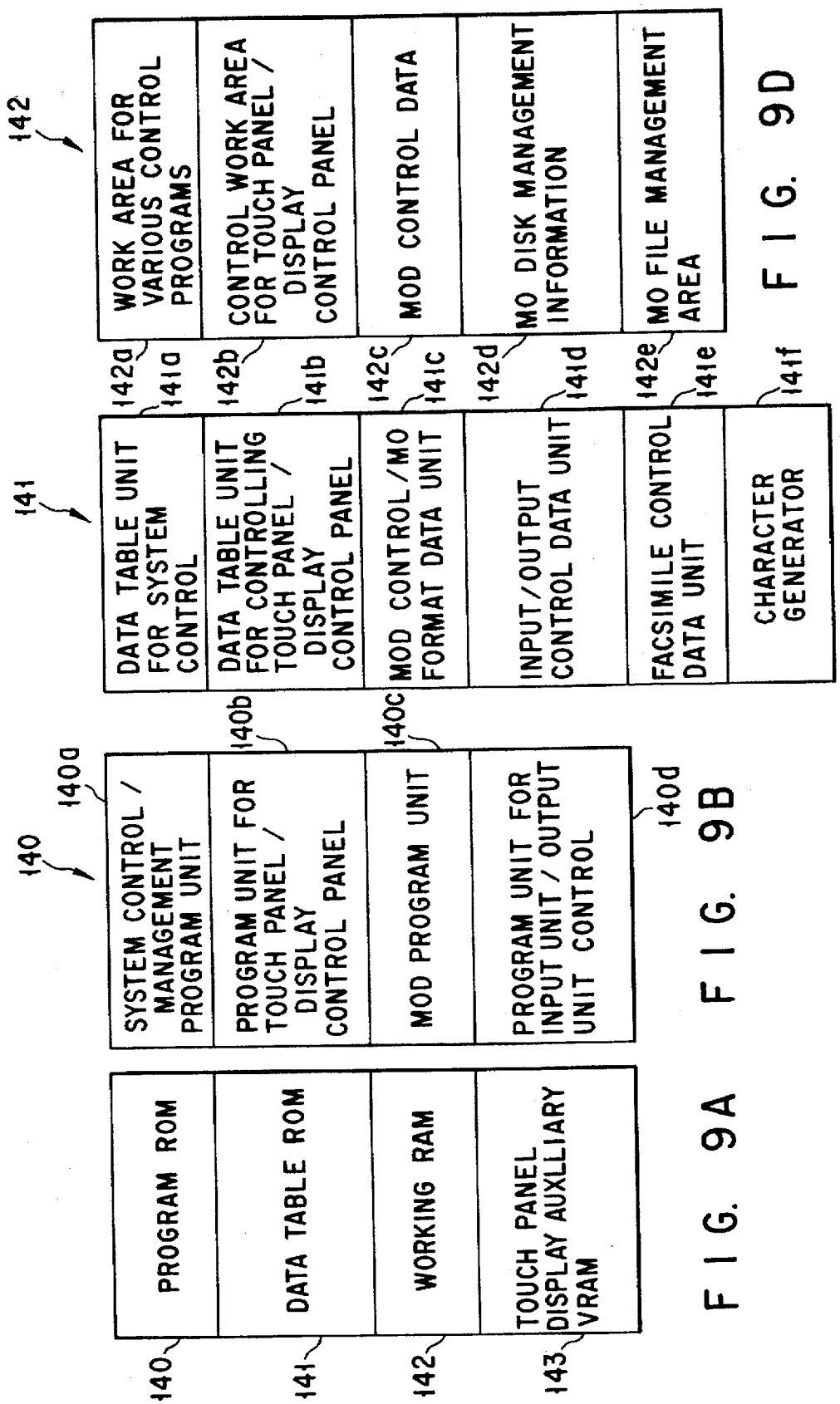

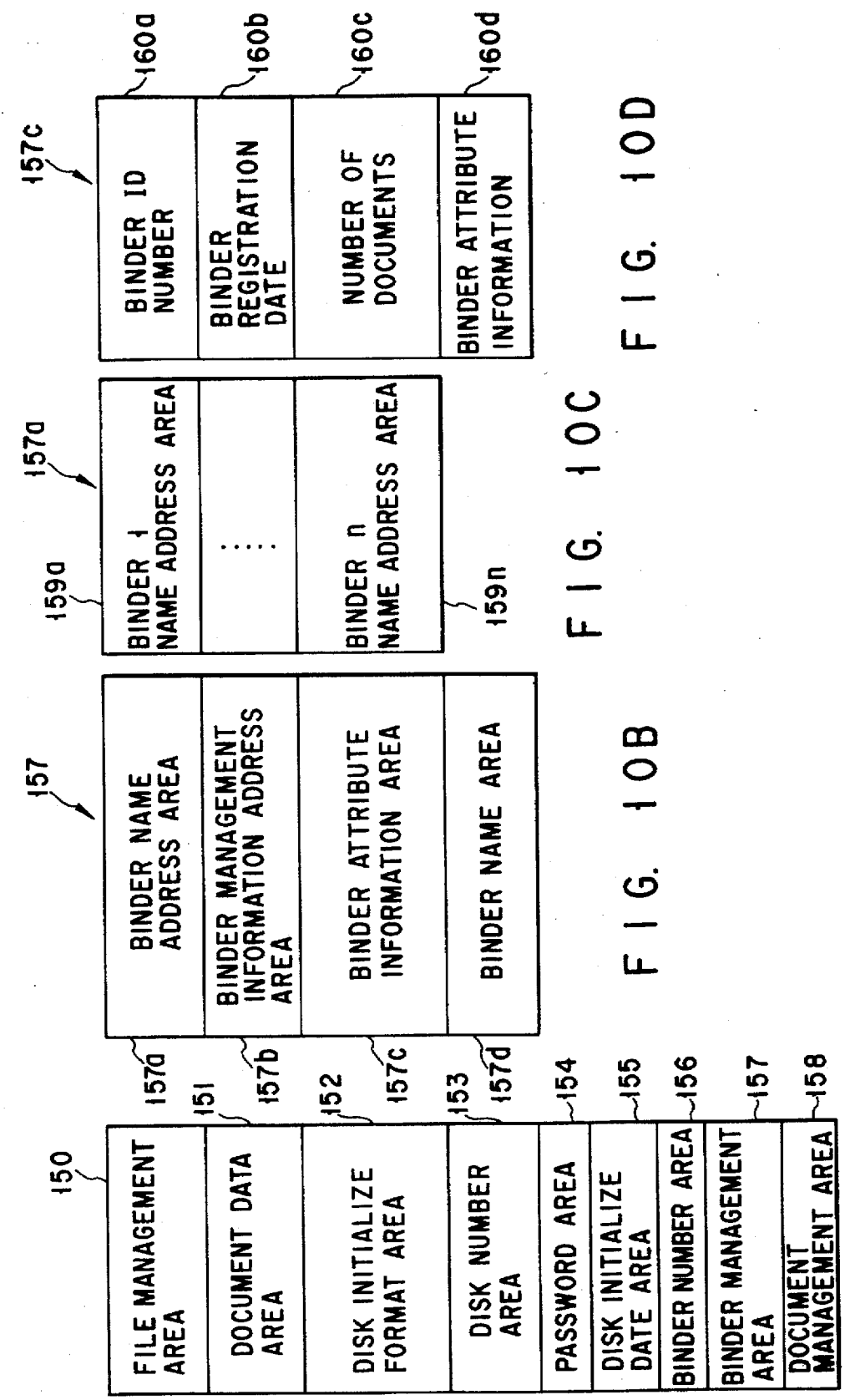

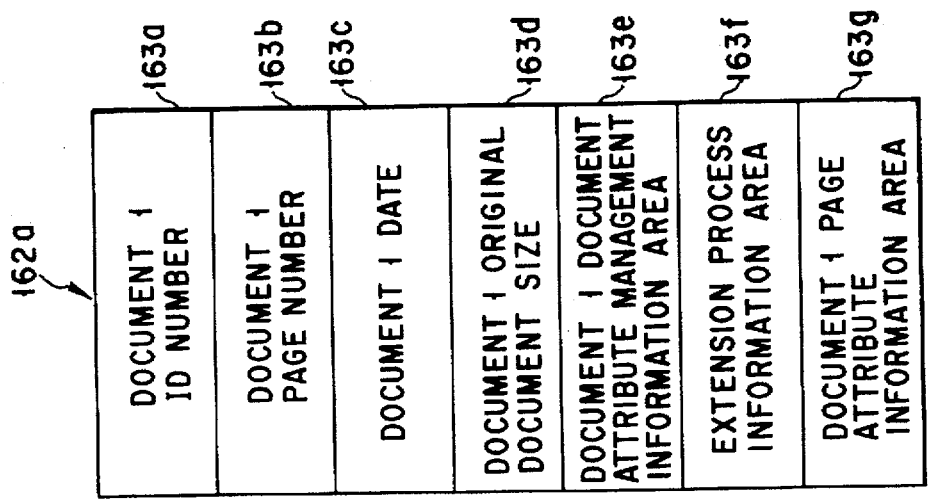
FIG. 11D
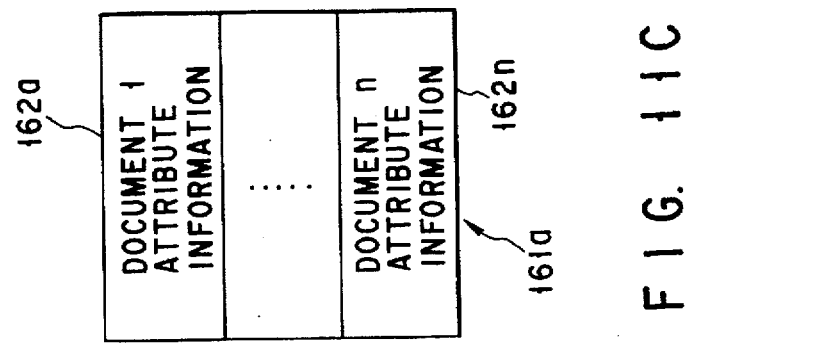
FIG. 11C
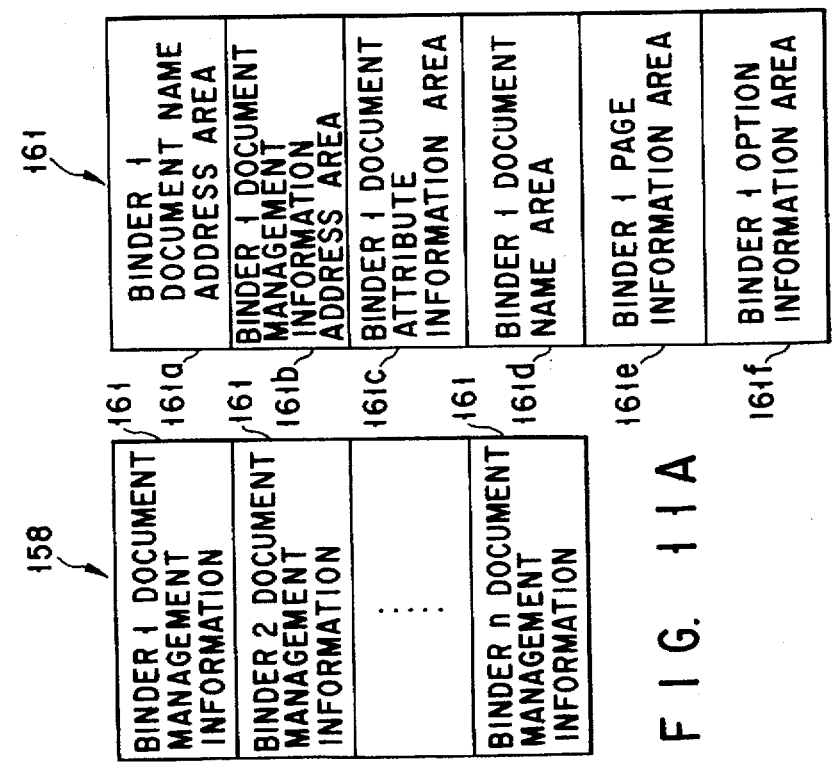
FIG. 11B
FIG. 11A

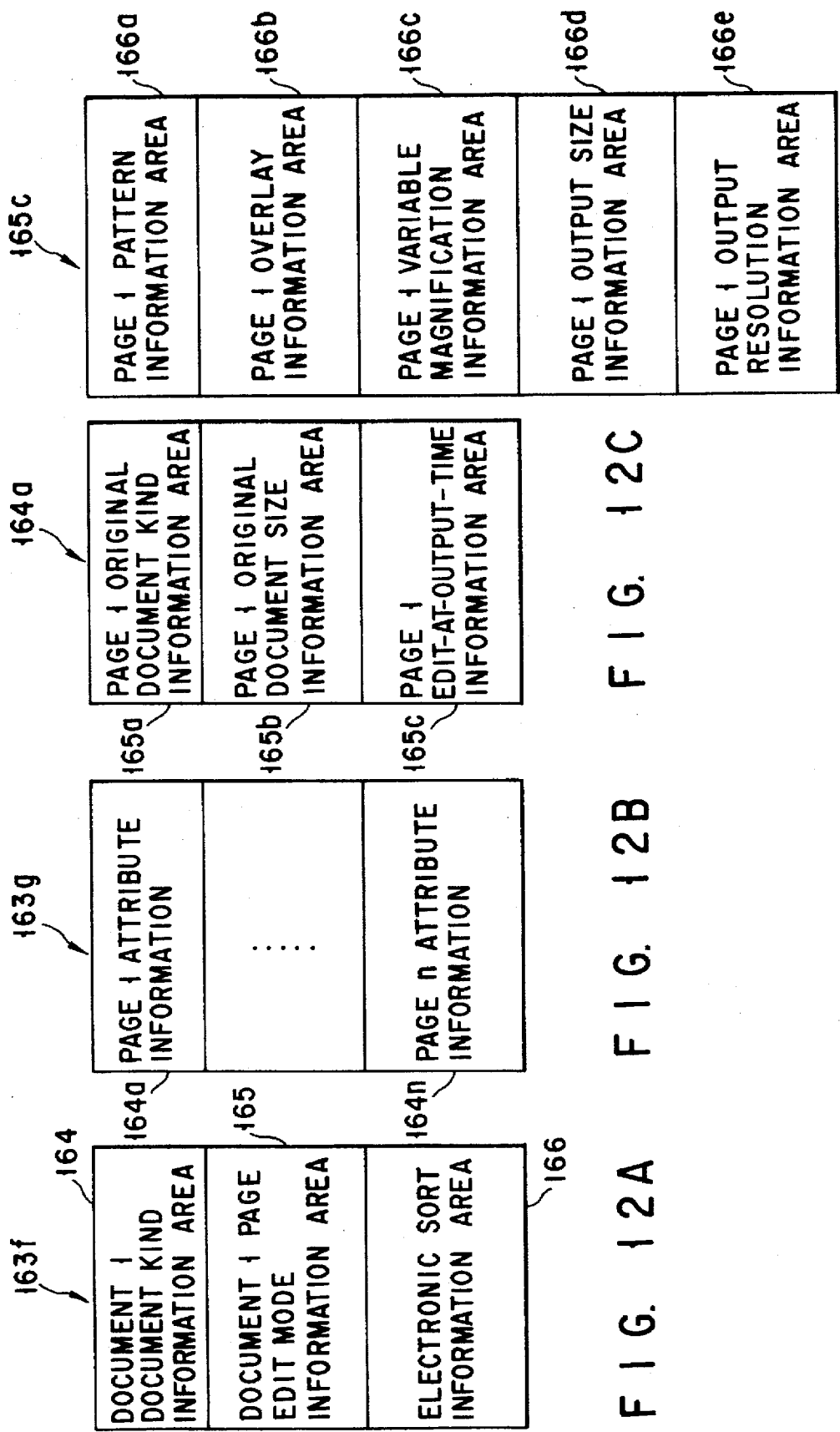

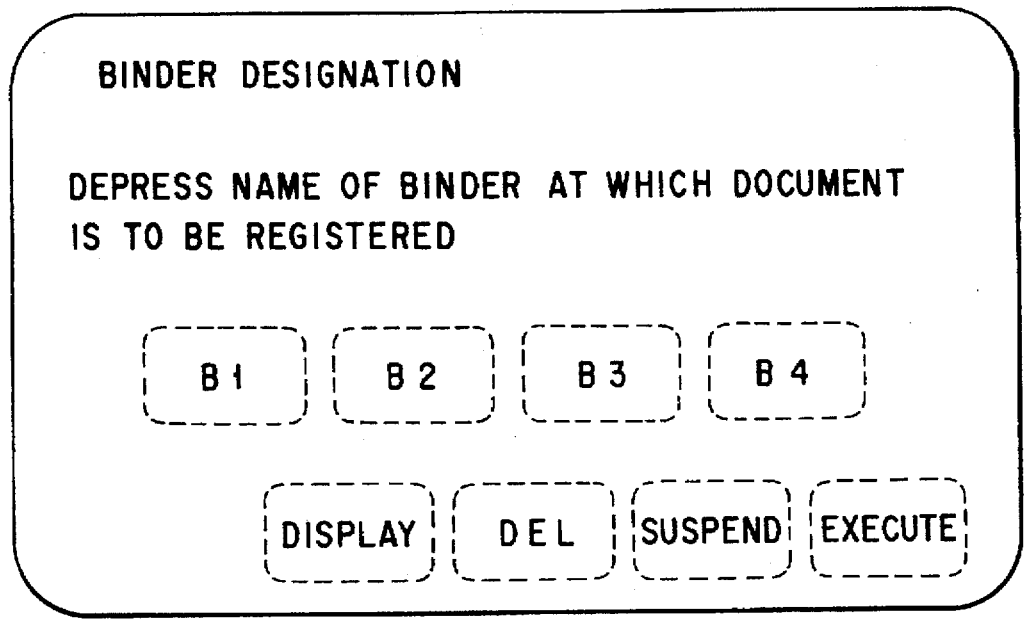
F I G. 13C
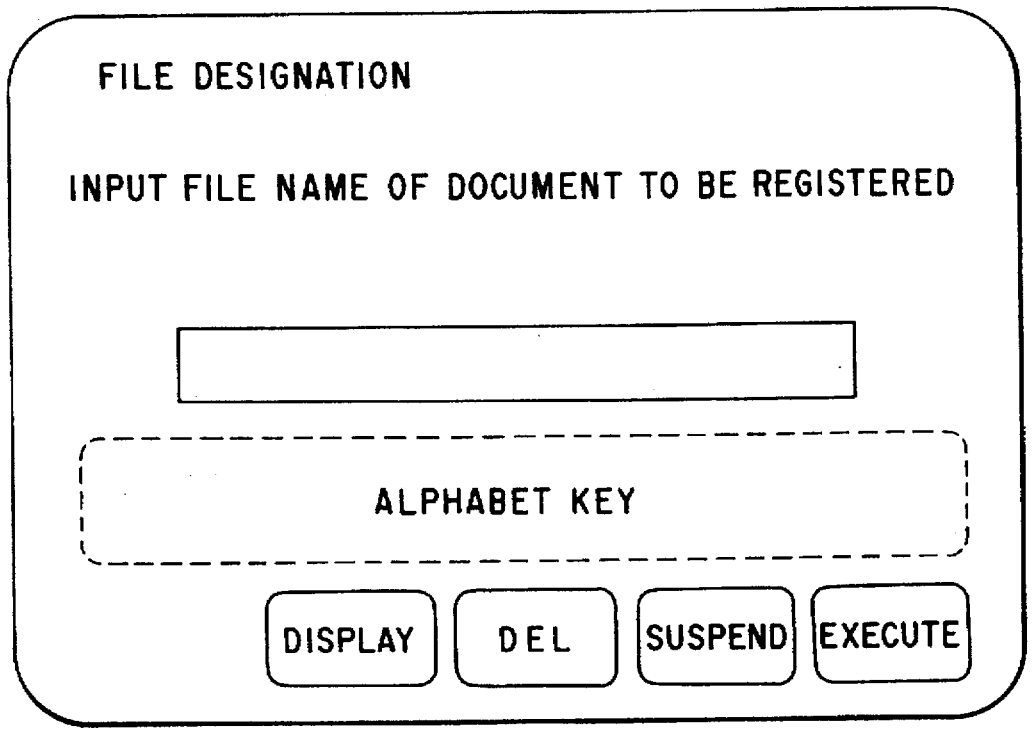
F I G. 13D

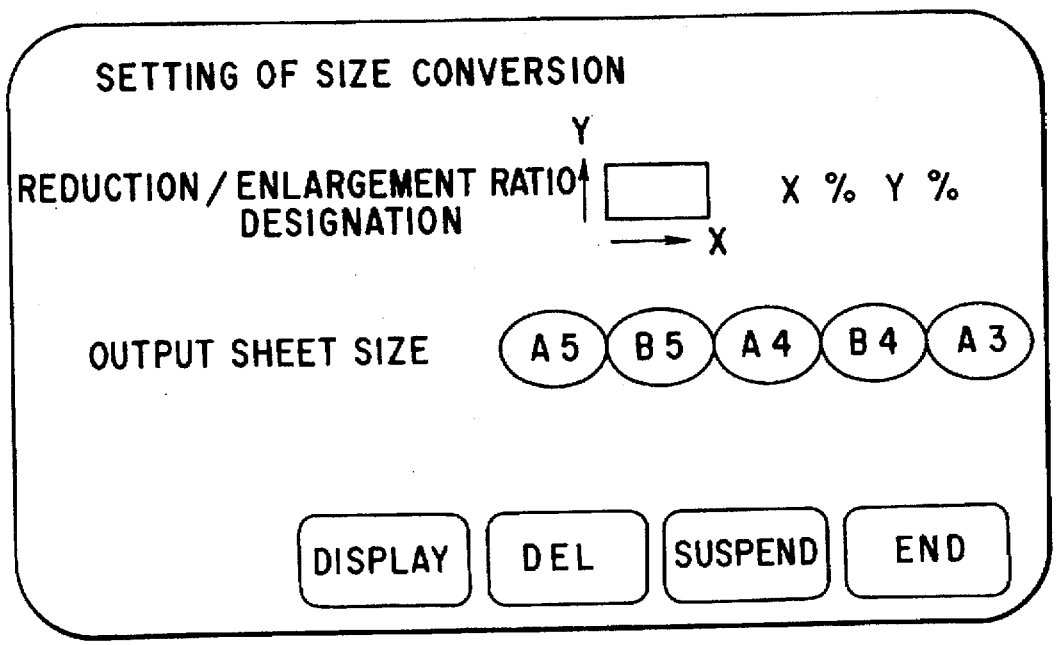
F I G. 14A
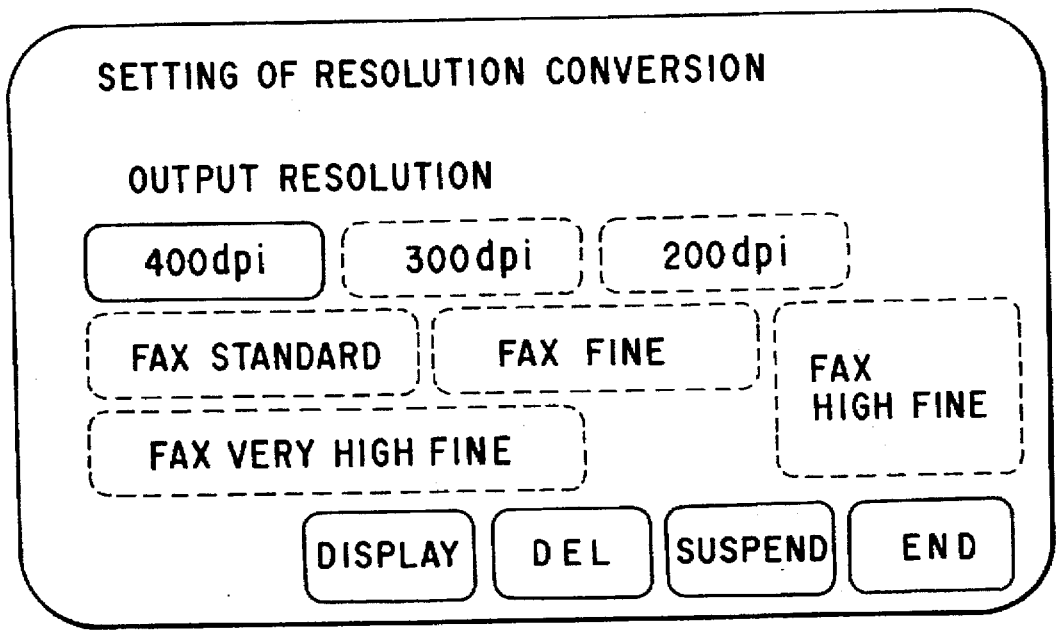
F I G. 14B

SETTING OF PAGE COUPLING PROCESS /
DIVISION PROCESS

- 2 in 1
- 4 in 1
- 1 out 2
- 1 out 4

DISPLAY | DEL | SUSPEND | END

F I G. 14C

SETTING OF PATTERN OVERLAY

REFERENCE PATTERN SELECT

- TOSHIBA LOGO
- LETTER HEAD
- STAMP OF CONFIDENTIALITY IN COMPANY

UPPER LEFT | UPPER CENTER | UPPER RIGHT | LOWER LEFT | LOWER CENTER | LOWER RIGHT

DISPLAY | DEL | SUSPEND | EXECUTE

F I G. 14D

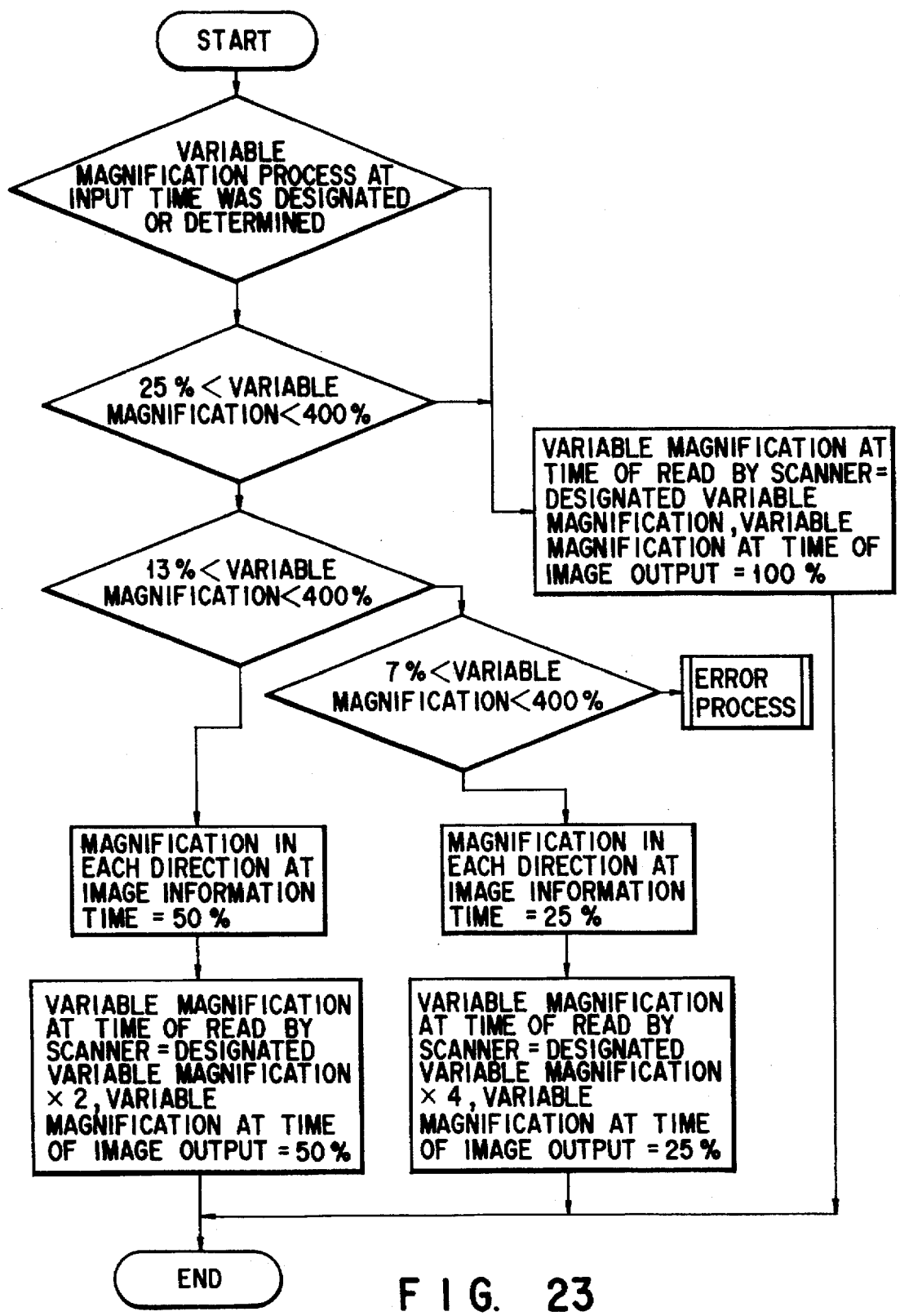
F I G. 23

IMAGE FORMING APPARATUS HAVING AUTOMATIC EDIT TIMING

BACKGROUND OF THE INVENTION

1. Field of the Invention

The present invention relates generally to an image forming apparatus and more particularly to an image forming apparatus such as a digital copying machine of the type in which a scanner and a printer are separately provided, the digital copying machine having memory means for storing an image read by the scanner and a function of reading out the stored image and recording and outputting the image by the printer on an as-needed basis.

2. Description of the Related Art

In a conventional digital copying machine having a filing function as well as an image editing function, an original document is scanned by a scanner and the scanned image data is stored in a memory, a magnetic disk or a magneto-optical disk. In this case, before storing the scanned image data in the memory, etc., the scanned image data is subjected to image editing processes such as quantization (digitization), conversion of resolution, conversion of size, and page coupling for coupling a plurality of original documents into one page. When the stored image data is output, the image data is read out from the memory, the magnetic disk, magneto-optical disk, etc. and the read-out data is subjected to conversion of resolution, conversion of size, etc. in accordance with image editing designated at the time of output or functions of a destination-side facsimile apparatus. Then, the image data is output.

In the case where the image data read by the scanner is subjected to the designated image editing process at the time of input, if further image editing is needed at the time of output, the image data is subjected to image editing several times. As a result, the image quality may deteriorate.

Among digital copying machines of the above type, there are known machines with automatic document feeders (ADF) for automatically feeding a plurality of documents successively to a document table. Regarding the ADFs, a last-page-first type ADF is known wherein set documents are fed successively from the last page. When a page coupling process, e.g. a 2-in-1 process, is performed by a digital copying machine with such a last-page-first type ADF, the following problem will occur.

In the 2-in-1 process, two documents are read by a scanner and the image data of the read two documents is stored as image data of one page. In the case where the 2-in-1 process is performed by using the last-page-first type ADF, if the number of documents is odd, the last input page, i.e. the page on which the first document page should appear, becomes vacant and an unnatural output result is produced.

SUMMARY OF THE INVENTION

The present invention has been made in consideration of the above circumstances and the object thereof is to provide an image forming apparatus capable of preventing degradation in image quality and occurrent of an unnatural output result.

In order to achieve the above object, there is provided an image forming apparatus having a scanner for scanning an image on a document, a memory for storing the scanned image in a storage medium, a device for reading the scanned image from the storage medium, and a device for forming an image on an image formation medium. An instruction device selects the time at which a designated edit process is executed for operation on the scanned image data, which may be at the time the scanned image in stored in memory, or when the image is formed on the image formation medium.

In the apparatus having the above structure, the instructing means indicates the time at which the edit process of the image data scanned by the scanning means is executed, according to the content of the designated edit process. On the basis of the instruction, the edit process is executed when the image is stored in the storage medium, or when the image formation is performed by the image forming means. For example, the time at which the edit process is executed is determined in accordance with the possibility of a variable magnification process at a time of output based on the designated edit process and a variable magnification ratio designated by the designation means.

Another image forming apparatus according to the present invention includes means for transmitting the image data of the image scanned by the scanning means or the image data read out by the reading out means. In this apparatus, the executing means executes the edit process of the image data in accordance with the instruction by the instructing means, at one of a time of storing the image data in the storage medium, a time of forming the image by the image forming means, and a time of transmitting the image data by the transmitting means.

Still another image forming apparatus according to the invention includes means for selecting one of a saving mode and a normal mode of the storage medium; first execution means for executing the edit process of the image data in accordance with the instruction by the instructing means, at one of a time of storing the image data in the storage medium and a time of forming the image by the image forming means; and second execution means for executing the edit process of the image data at the time of storing the image data in the storage medium, irrespective of the instruction by the instructing means, in one of the case where the memory capacity of the storage medium has decreased to a predetermined level and the case where the saving mode of the storage medium has been selected.

Still another image forming apparatus of the invention includes means for executing the edit process of the image data in accordance with the instruction by the instructing means, at a time of storing the image data in the storage medium, at a time of forming the image by the image forming means, or at both times of storing the image data in the storage medium and forming the image by the image forming means.

Still another image forming apparatus of the invention includes a document feeder for successively feeding a plurality of original documents set in a stacked manner from the last page, a scanner for scanning an image on a fed document, a memory for storing the scanned image in a storage medium, a device for reading the scanned image from the storage medium, and a device for forming an image on an image formation medium. A device designates the content of an edit process for editing the image data so that an image different than the original scanned image is formed on the image formation device. A selection device selects a saving mode or a normal mode for the storage medium. An instruction device selects the time at which a designated edit process is executed for operation on the scanned image data, which may be at the time the scanned image in stored in memory, or when the image is formed on the image formation medium, and a first execution device executes the edit process. A second execution device operates to couple a plurality of image data into one image at the time of storing image data in the storage medium, regardless of the instruction device, when the capacity of the storage medium has decreased to a predetermined level and the saving mode is selected. A device is also provided for altering the position of the coupled image data while the edit process is executed by the second execution device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 23 show an image forming apparatus according to an embodiment of the present invention, in which:

FIG. 1 is a perspective view showing the external appearance of the image forming apparatus;

FIG. 2 is a cross-sectional view of the image forming apparatus;

FIG. 3 is a block diagram showing schematically a main structure of the image forming apparatus;

FIG. 4 is a block diagram showing schematically the structure of a control unit of the image forming apparatus;

FIG. 5 is a block diagram showing schematically the structure of a magneto-optical disk apparatus;

FIG. 6 is a block diagram showing an internal structure of a digitizing image processing unit;

FIG. 7 is a plan view showing schematically the structure of an operation panel;

FIG. 8 is a block diagram showing schematically an internal structure of the operation panel;

FIGS. 9A to 9D show schematically the map structure of a main memory;

FIGS. 10A to 10D show storage formats of image data management data and image data itself on a magneto-optical disk;

FIGS. 11A to 11D show storage formats of image data management data and image data itself on a magneto-optical disk;

FIGS. 12A to 12D show storage formats of image data management data and image data itself on a magneto-optical disk;

FIGS. 13A to 13F are plan views showing examples of screens displayed on a liquid crystal display of the operation panel;

FIGS. 14A to 14F are plan views showing examples of screens displayed on a liquid crystal (LC) display of the operation panel;

FIG. 16 shows schematically a main structure of the present apparatus;

FIG. 17 is a flow chart illustrating the operation of determining the timing of editing processing;

FIG. 18 is a flow chart illustrating the operation at the time of input processing;

FIG. 19 is a flow chart illustrating the operation at the time of output processing;

FIG. 20 illustrates the relationship among editing processes performed by the present apparatus, the setting of the editing processes for various documents, and the timing of performing the editing processes, at the time of registration;

FIG. 21 illustrates the relationship among editing processes performed by the present apparatus, the setting of the editing processes for various documents, and the timing of performing the editing processes, at the time of output processing;

FIG. 22 show comparatively the operation of a 4-in-1 page coupling process in the prior art and the operation of a 4-in-1 page coupling process in a memory saving mode in the embodiment of the invention; and FIG. 23 is a flow chart illustrating the operation in the case where a reduction ratio falling out of a predetermined range is designated.

DETAILED DESCRIPTION OF THE PREFERRED EMBODIMENT

An embodiment of the present invention will now be described with reference to the accompanying drawings.

Figure 1:
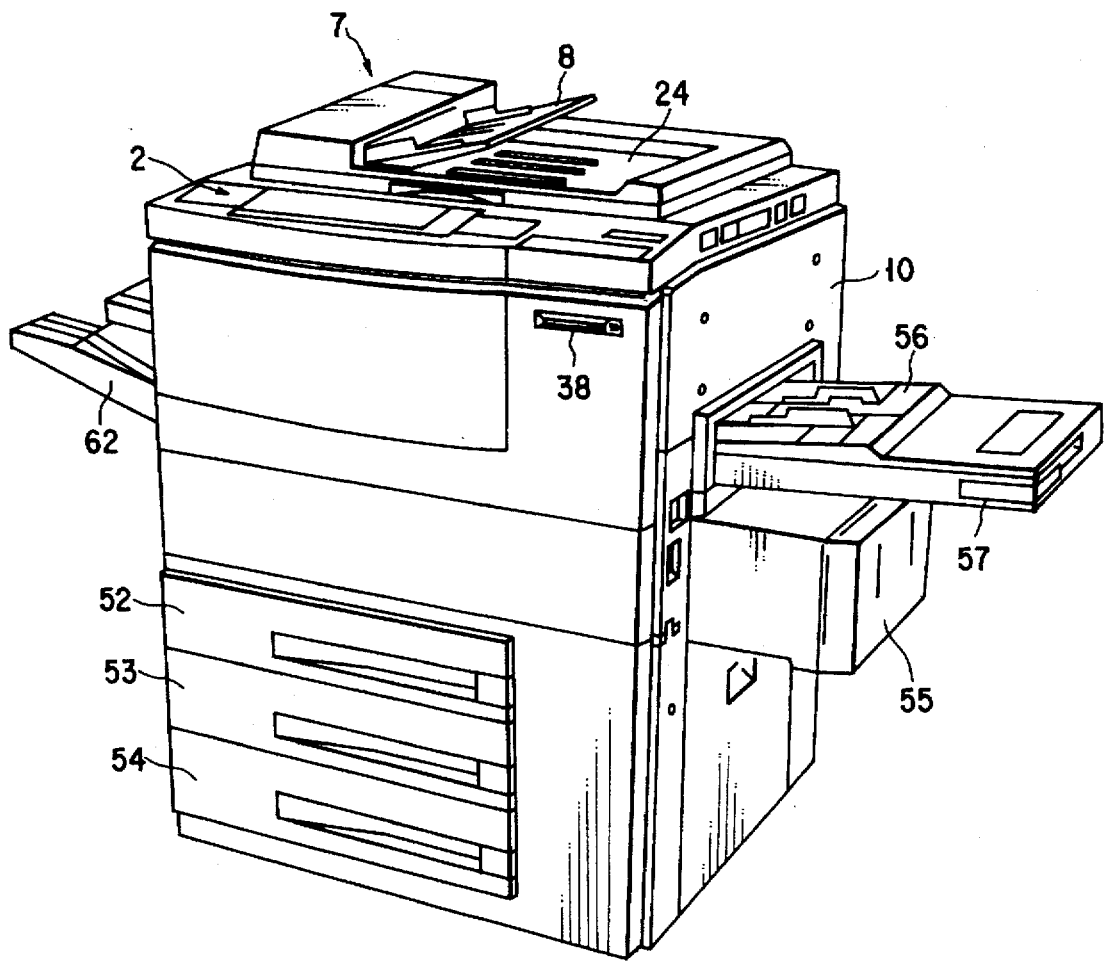
Figure 2:
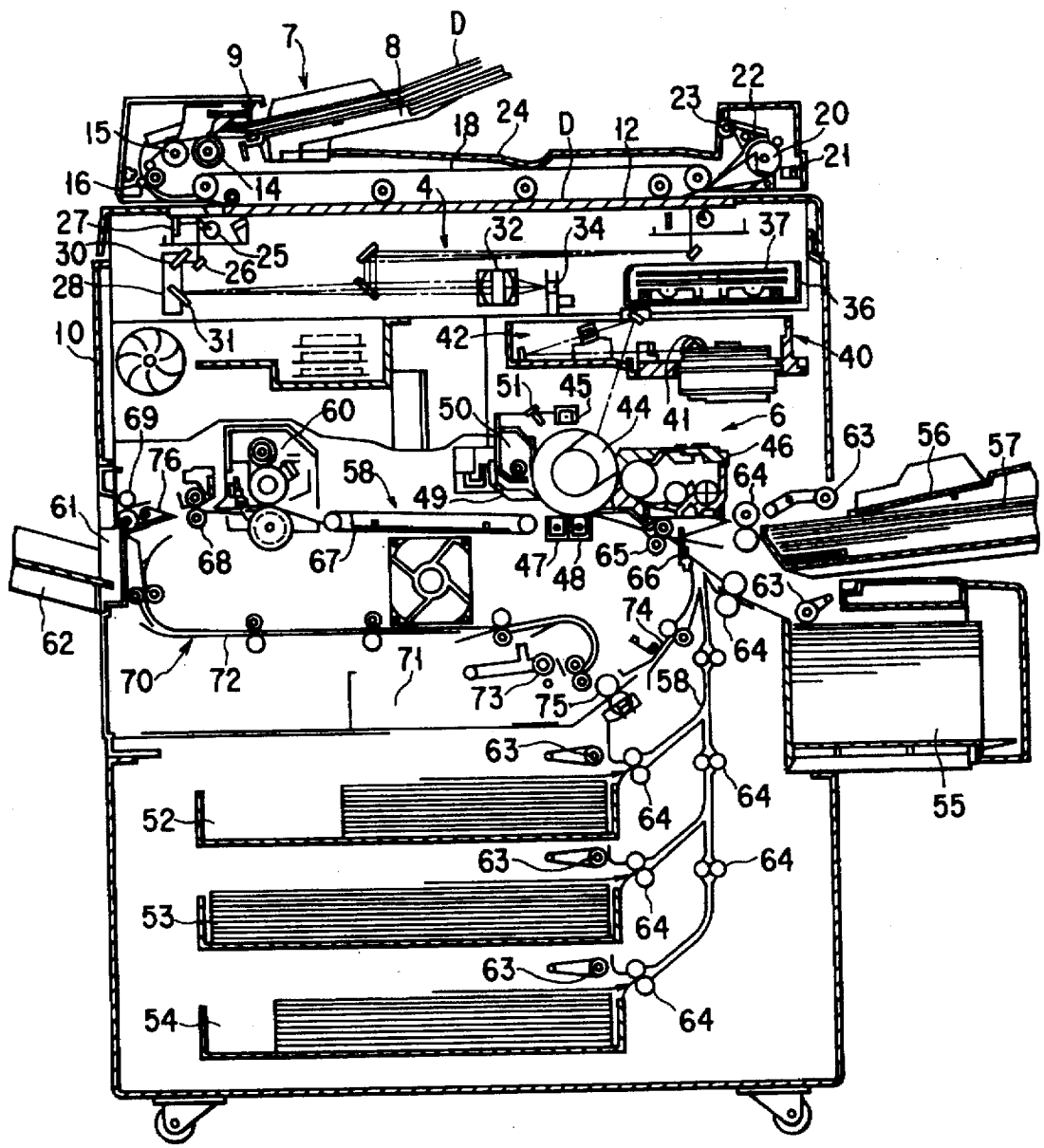

As is shown in FIGS. 1 and 2, an image forming apparatus according to the present embodiment has an apparatus body 10. An operation panel 2 is provided on an upper front portion of the apparatus body 10. The apparatus body 10 includes a scanner 4 functioning as scanning means (described later) and an image forming unit 6 functioning as image forming means. A document table 12 formed of transparent glass, on which an object to be read, i.e. a document D, is placed, is provided on a top face of the apparatus body 10.

An automatic document feeder (ADF) 7 for automatically feeding documents onto the document table 12 is provided on the top of the apparatus body 10. The ADF 7 is provided to be openable in relation to the document table 12. The ADF 7 serves also as a document holder for bringing the document D into close contact with the document table 12.

The ADF 7 comprises a document tray 8 on which the document D is placed, an empty sensor 9 for sensing the presence/absence of the document D, a pick-up roller 14 for picking up documents D from the document tray 8 one by one, feed rollers 15 for conveying the picked-up document, a pair of aligning rollers 16 for aligning the front end of the document D, and a convey belt 18 provided in such a way that the belt 18 covers the document table 12 almost entirely. The ADF 7 is constructed as a so-called "last-page-first" type in which a plurality of documents D placed on the document tray 8 with their obverse sides set upward are fed one by one from the last page.

In the ADF 7, a reverse rotation roller 20, a non-reverse rotation sensor 21, a flapper 22 and a sheet discharge roller 23 are provided on the side opposed to the aligning rollers 16 with the convey belt 18 interposed. The document D, the image information on which has been read by the scanner 4 (described later), is fed out of the document table 12 by the convey belt 18 and discharged onto a document discharge section 24 on the upper surface of the ADF 7 via the reverse rotation roller 20, flapper 21 and discharge roller 22. When the reverse side of the document D is read, the flapper 22 is switched. Thereby, the document D fed by the convey belt 18 is reversed by the reverse rotation roller 20 and fed once again to a predetermined position on the document table 12 by the convey belt 18.

The scanner 4 provided within the apparatus body 10 includes a light source 25 such as a fluorescent lamp for illuminating the document D on the document table 12 and a first mirror 26 for deflecting a reflection beam from the document D in a predetermined direction. The light source 25 and first mirror 26 are attached to a first carriage 27 disposed below the document table 12. The first carriage 27 is situated so as to be movable in parallel to the document table 12. The first carriage 27 is reciprocally moved below the document table 12 by a drive motor via a toothed belt (not shown), etc.

A second carriage 28, which is movable in parallel to the document table 12, is disposed below the document table 12. The second carriage 28 includes second and third mirrors 30 and 31 situated at right angles with each other for successively deflecting the reflection beam from the document D, which has been deflected by the first mirror 26. The second carriage 28 is driven by the toothed belt, etc. for driving the first carriage 27, following the movement of the first carriage 27. Specifically, the second carriage 28 is moved in parallel to the first carriage at half the speed of the first carriage.

A focusing lens 32 for focusing a reflection beam from the third mirror 31 mounted on the second carriage 28 and a CCD sensor 34 for photoelectrically converting the reflection beam focused by the focusing lens are provided below the document table 12. The focusing lens 32 is disposed in a plane including the optical axis of the beam deflected by the third mirror 31 so as to be moved by means of a drive mechanism. The focusing lens 32 itself moves to focus the reflection beam at a desired magnification. The CCD sensor 34 photoelectrically converts the incident reflection beam and outputs an electric signal corresponding to the read document D.

A magneto-optical disk apparatus 36 for storing image information on the document D read by the scanner 4, facsimile transmission/reception document information, etc. is disposed below the document table 12. The magneto-optical disk apparatus 36 has a magneto-optical disk 37 as a storage medium. The magneto-optical disk can be loaded/unloaded through an insertion port 38 formed in the front face of the apparatus body 10.

As is shown in FIG. 2, the image forming unit 6 includes a laser exposure device 40 functioning as exposure means. The laser exposure device 40 includes a semiconductor laser 41 functioning as a light source and an optical device 42. The optical device 42 alters the intensity of the laser beam emitted from the laser 41 in accordance with the image information on the document D read by the scanner 4, facsimile transmission/reception document information, etc. and lets the obtained laser beam travel towards a photosensitive drum (described later) functioning as an image carrier.

The image forming unit 6 also includes a rotatable photosensitive drum 44 functioning as an image carrier provided at substantially the center of the apparatus body 10. The surface of the photosensitive drum is exposed with a laser beam from the laser exposure device 40 and a desired electrostatic latent image is formed on the surface of the photosensitive drum. The photo-sensitive drum 44 is surrounded successively by a charger 45 for charging the surface of the drum to a predetermined charge level; a developing unit 46 for supplying toner or a developer onto the electrostatic latent image formed on the surface of the photosensitive drum and developing the latent image at a desired image density; a transfer charger 48, having as one body a peeling charger 47 for separating a transferred member fed from a sheet cassette (described later), i.e. a copy sheet P, from the photosensitive drum, for transferring a toner image formed on the photosensitive drum onto the sheet P; a peeling claw 49 for peeling the sheet P from the surface of the photosensitive drum; a cleaning device 50 for cleaning toner remaining on the surface of the photosensitive drum; and a de-electrifier 51 for de-electrifying the surface of the photosensitive drum.

In the lower part of the apparatus body 10, an upper cassette 52, a middle cassette 53 and a lower cassette 54 are situated in a stacked manner such that these cassettes can be withdrawn from the apparatus body. A large-capacity feeder 55 is provided on the side of these cassettes. The large-capacity feeder 55 stores about 3,000 copy sheets of frequently used size, e.g. A4 size. A paper feed cassette 57 functioning also as a manual feed tray 56 is detachably mounted above the large-capacity feeder 55.

A convey path 58 is formed within the apparatus body 10. The convey path 58 extends from each cassette and large-capacity feeder 55 through a transfer unit situated between the photosensitive drum 44 and the transfer charger 48. A fixing device 60 is provided at a terminal end of the convey path. A discharge port 61 is formed in that portion of a side wall of the apparatus body 10, which is opposed to the fixing device 60. A sheet discharge tray 62 is mounted in the discharge port 61.

Pick-up rollers 63 for picking up sheets one by one from the upper cassette 52, middle cassette 53, lower cassette 54, feed cassette 57 and large-capacity feeder 55 are provided near these cassettes and feeder. A number of pairs of feed rollers 64 for conveying copy sheets P picked up by the pick-up rollers 63 through the convey path 58 are provided along the convey path 58.

A pair of resist rollers 65 are provided on the upstream side of the photosensitive drum 44 along the convey path 58. The resist rollers 65 correct an inclination of the picked-up copy sheet P, aligns a front end of a toner image on the photosensitive drum 44 with a front end of the copy sheet P, and feeds the copy sheet P to the transfer unit at the same speed as the speed of movement of the outer peripheral surface of the photo-sensitive drum. A pre-aligning sensor 66 for sensing the arrival of the copy sheet P is provided in front of the resist roller pair 65, i.e. on the feed roller side.

Each of the copy sheets P picked up by the pick-up roller 63 one by one from each cassette or large-capacity feeder 55 is sent to the resist roller pair 65 by the feed roller pair 64. After the front end of the copy sheet P is aligned by the resist roller pair 65, the sheet P is sent to the transfer unit. In the transfer unit, a developer image formed on the photosensitive drum 44, i.e. a toner image, is transferred onto the sheet P by the transfer charger 48. The copy sheet P on which the toner image has been transferred is peeled from the surface of the photosensitive drum 44 by the functions of the peeling charger 47 and peeling claw 49 and sent to the fixing device 60 via the convey belt 67 constituting a part of the convey path 52. After the developer image is melted and fixed on the copy sheet p by the fixing device 60, the copy sheet P is discharged onto the discharge tray 62 through the discharge port 61 by a pair of feed rollers 68 and a pair of discharge rollers 69.

A reversing mechanism 70 for reversing the copy sheet P, which has passed through the fixing device 60, and sending the sheet P to the resist roller pair 65, is provided below the convey path 58. The reversing mechanism 70 comprises a temporary stacking unit 71 for temporarily stacking the copy sheet P, a reversing path 72, branched from the convey path 58, for reversing the copy sheet P, which has passed through the fixing device 60, and guiding the sheet P to the temporary stacking unit 71, a pick-up roller 73 for picking up one by one the copy sheets P stacked on the temporary stacking unit, and a feed roller 75 for feeding the picked-up sheet to the resist roller pair 65 through the convey path 74. A sorting gate 76 for sorting the copy sheet P to the discharge port 61 or reversing path 72 is provided at a branching portion between the convey path 58 and reversing path 72.

when double-side copy is performed, the copy sheet P which has passed through the fixing device 60 is guided to the reversing path 72 by the sorting gate 76. The reversed copy sheet P is temporarily stacked on the temporary stacking unit 71 and then sent to the resist roller pair 65 through the convey path 74 by the pick-up roller 73 and feed roller pair 75. After the copy sheet P is aligned by the resist roller pair 65, the sheet P is sent to the transfer unit once again and the toner image is transferred on the reverse surface of the copy sheet P. Thereafter, the copy sheet P is discharged onto the discharge tray 62 via the convey path 58, fixing device 60 and discharge roller 69.

Besides, as is shown in FIG. 1, the operation panel 2 disposed on the upper front portion of the apparatus body 10 is provided with a display unit for displaying the operation state of the apparatus and various information, number keys, various a mode setting key for setting various operation modes, a document size key, a sheet size key, a copy start key, a magnification selection key, etc.

Furthermore, the apparatus body 10 includes, as described later, a facsimile controller for transmitting document information input by the scanner 4 or document information stored in a magneto-optical disk to a facsimile network and receiving document information via the facsimile network, and a LAN controller for transmitting document information input by the scanner 4 or document information stored in a magneto-optical disk to a LAN (local area network) and receiving document information via the LAN.

Figure 3:
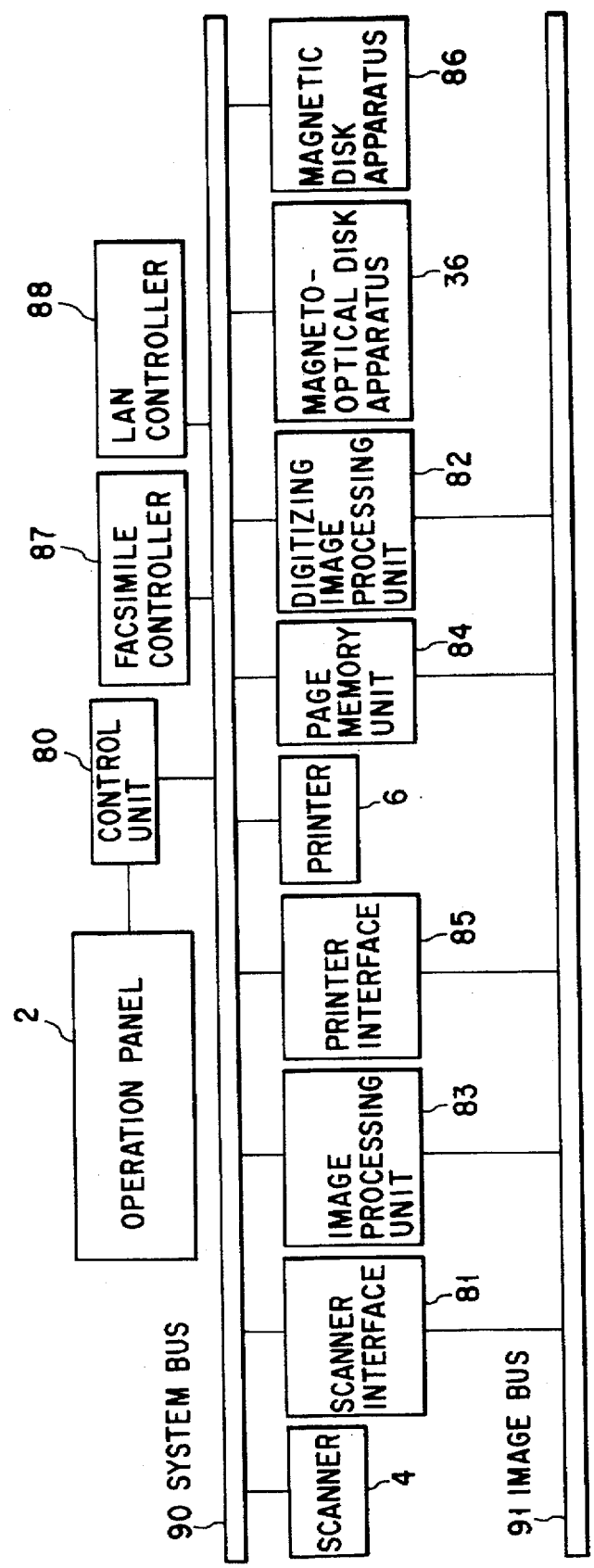

FIG. 3 shows schematically the structure of a control system and a drive system of the image forming apparatus having the above structure. As is seen from FIG. 3, the control system comprises a control unit 80 for controlling the operation of the entire apparatus, a scanner interface 81 for receiving image data from the scanner 4, a digitizing image processing unit 82 for subjecting multi-value image data to a digitizing process and a compression/extension process and temporarily holding image data subjected to the compression/extension process, an image processing unit 83 for an image quality enhancing process or an enlargement/reduction process in accordance with the image forming unit 6 (printer) having the laser exposure device 40, a multi-value page memory unit 84 having multi-value bits for one pixel, and a printer interface 85 for transferring image data to the printer.

The control unit 80 is connected to an operation panel 2, a magneto-optical disk apparatus 36 for storing compressed image data, a magnetic disk apparatus 86 used as an auxiliary memory for storing management information of a magneto-optical disk, etc., a facsimile controller 87 for controlling the transmission/reception operation of the facsimile, and a LAN controller 88 for controlling the transmission/reception operation of the LAN.

The scanner 4, scanner interface 81, digitizing image processing unit 82, image processing unit 83, page memory unit 84, printer interface 85, printer 6, magneto-optical disk apparatus 36, magnetic disk apparatus 86, facsimile controller 87 and LAN controller 88 are connected to the control unit 80 via the system bus 90. The scanner interface 81, digitizing image processing unit 82, image processing unit 83, page memory unit 84 and printer interface 85 are connected to each other via the image bus 91.

Control signals and data signals are transmitted between the control unit 80 and each device via the system bus 90. Image data is transferred at high speed between the respective devices via the image bus 91.

When the image forming apparatus operates in real time as a copying machine, the image bus 91 functions to perform parallel operations wherein the scanner interface 81 receives image data from the scanner 4, the image processing unit 83 and digitizing image processing unit 82 perform the image quality enhancing process, enlargement/reduction process, and digitizing/multi-value generating process, and the printer interface 85 outputs the processed data to the printer 6. The devices (boards) on the image bus 91, which are unnecessary for the processes at that time are set in the "pass" state.

For example, in a normal copying operation, the digitizing image processing unit 82 is needless and is set in the "pass" state. In a file-simultaneous-copy operation mode in the present invention, the image processing unit 83 and page memory unit 84 are normally set in the "pass" state. In the file-simultaneous-copy operation mode, the copy output image is, in many cases, digitized, like the registered image in the magneto-optical disk, in order to confirm the image quality of the registered image in the magneto-optical disk, thereby to equalize the image quality of the registered image to that of the copy output image. In this case, the image processing unit 83 is needless. When the apparatus is operated in an "enhanced image quality copy" mode or in a "file-simultaneous enhanced image quality copy" mode, the image quality of the copy output image is enhanced by the image processing unit 83. Although the registered image is digital data, the copy output image remains multi-value data.

The scanner 4 scans and reads document information of the document D, line by line, which is placed on the document table 12, in accordance with a command from the control unit 80 by means of the CCD 34 constituting a line sensor having a plurality of light receiving elements arranged, for example, in lines. Then, the scanner 4 converts density of image to 8-bit digital data and outputs the 8-bit digital data as time-serial digital data to the scanner interface 85 along with a sync signal.

In response to a command from the control unit 80, the printer or image forming unit 6 receives 8-bit digital image data from the printer interface 85 along with the sync signal. Thereby, the printer forms an electrostatic latent image on the photosensitive drum 44 by a laser beam having a pulse width corresponding to the quantity of image data. Subsequently, the electro-static latent image is made visible by the developing unit 46. Further, the visible image is transferred onto the fed copy sheet by the transfer unit 48. The image transferred onto the copy sheet is fixed by the fixing unit 60.

FIG. 4 shows schematically the structure of the control unit 80. The control unit 80 comprises a CPU 92 for effecting various controls, an operation panel interface 93 with the operation panel 2, a main memory 94 for storing various control programs and various management information, a timer 95, a magnetic disk interface 96, a magneto-optical disk interface 97, and a system bus interface 98 with the system bus 90.

In response to a command from the control unit 80, the magneto-optical disk apparatus 36, reads and writes compressed digital document information and document search information via the magneto-optical disk interface 97. As is shown in FIG. 5, the magneto-optical disk apparatus 36 comprises a magneto-optical disk 37, a write control unit 101 for controlling a write operation on the magneto-optical disk, a read control unit 102 for controlling a read operation on the magneto-optical disk, a drive motor 103 for rotating the magneto-optical disk, and a drive control unit 104 which controls the write control unit, read control unit and drive motor and includes a data buffer (not shown) for temporarily storing image data from the control unit 80. For example, a magneto-optical disk 37 having a capacity of 600 MBytes is used as magneto-optical disk 37. Since non-compressed digital data of "A4" size and 400 dpi is about 2 MBytes, the disk can store at least 300 sheets of "A4" size.

Figure 6:
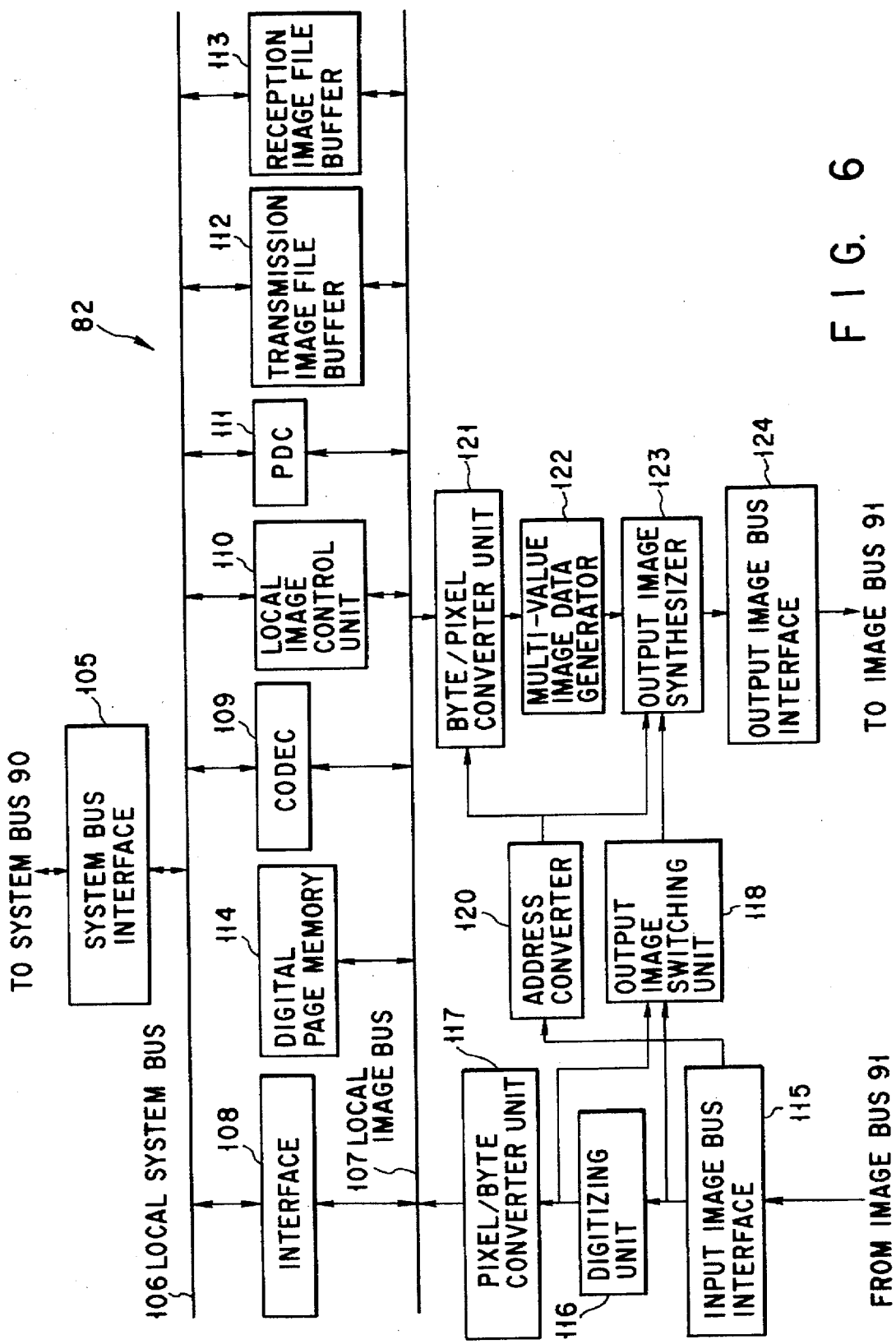

As is shown in FIG. 6, the digitizing image processing unit 82 comprises a system bus interface 105 with the system bus 90; a local system bus 106 for connection between each of the internal devices and the system bus 90; a local image bus 107; an interface 108; a CODEC (compression/expansion circuit) 109 for compressing and expanding digital image data; a local image bus control unit 110 for DMA control of the local image bus 107 and for channel control of the data bus; a PDC (integrated pixel density converter) 111 for performing a linear density conversion process for digital image data; a transmission image file buffer 112 for temporarily holding image data digitally compressed for the purpose of facsimile transmission; a reception image file buffer 113 for temporarily holding the digitally compressed image data received by the facsimile; a digital page memory 114 for holding digital image data of a plurality of pages; an input image bus interface 115 for providing interface with the image bus 91; a digitizing unit 116 for digitizing multi-value image data received via the input image bus interface 115 and/or converting the linear density; a pixel/byte converter 117 for converting pixel information of digital image data digitized by the digitizing unit 116 to units of bytes; an output image switching unit 118; an address converter 120; a byte/pixel converter unit 121 for converting the image information of the byte-unit digital image data to units of pixels; a multi-value image data generator 122 for generating multi-value image data from the digital data; an output image synthesizer; and an output image bus interface 124 for providing interface with the image bus 91.

Each of the transmission image file buffer 112 and reception image file buffer 113 has a capacity of storing at least several-ten pages of digitally compressed transmission/reception image data. The digitizing unit 116 digitizes multi-value image data received via the input image bus interface 115. The digitized data is converted to byte units by the pixel/byte converter 117 and held in the digital page memory 114.

Byte-unit data transfer is performed via the local image bus 107 within the digitizing image processing unit 82. Thus, when the image stored in the magneto-optical disk 37 is searched and output to the printer, the byte/pixel converter 121 performs reverse conversion of the width of the width of one pixel/local image bus 107. The digital page memory 114 has a capacity of storing several pages for simultaneously and parallelly performing an image registration operation for registration in the magneto-optical disk 37 and a copying operation.

The CODEC 109 constitutes a digital image data compression/expansion unit. The CODEC 109 compresses digital image data stored in the digital page memory 114 to register or store the digital image data and expands the compressed digital data searched from the magneto-optical disk 37 to digital data.

Digital data or multi-value data is used as output image data in accordance with the set mode (a normal image quality mode or a high image quality mode) of the file simultaneous copy operation. Thus, the bus is switched by the output image switching unit 118 in accordance with the set mode. The selected image data is synthesized by an output image synthesizer 123 and output via the image bus 92.

Figure 7:
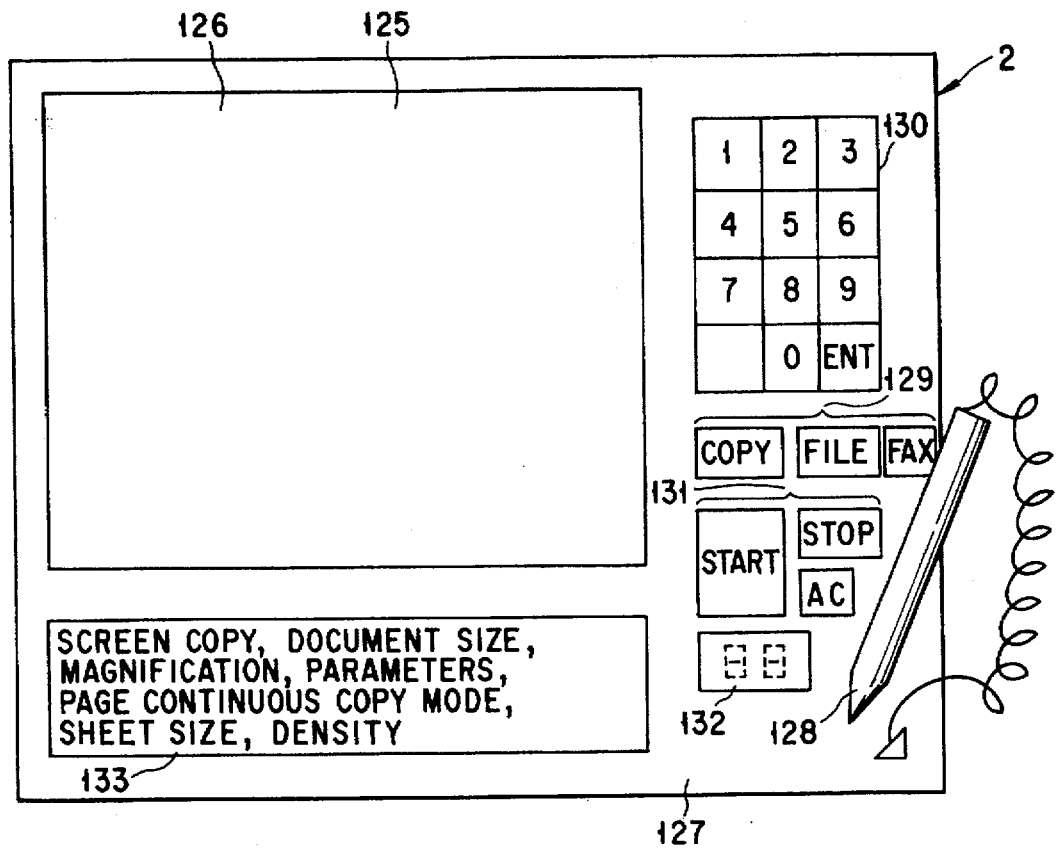

As is shown in FIG. 7, the operation panel 2 comprises a liquid crystal display (LCD) 126 constituting a touch panel 125; a control panel 127; and a conductive pen 128 for inputting data to the touch panel. The control panel 127 is provided with operation mode selection keys 129 for selecting one of a copy mode, a facsimile mode and a file mode; numeral keys 130 for inputting the number of copies, a facsimile number in a facsimile operation mode, a mail BOX number, a password in a confidential communication mode, etc.; operation control keys 131 including a start button, a stop button, and a clear/cancel button; a volume counter 132; and a setting section 133 for setting various parameters in the copy operation mode, such as a magnification, a document size, a sheet size, page continuous copy mode, etc., and various parameters in the facsimile transmission/reception mode, such as a document type, a character size, an abbreviated dialing designation/numeral key designation, etc.

If any one of the operation mode selection keys 129 is depressed, the LCD 126 displays a main menu of the selected operation mode, as will be described later. Touch panel 125 is operated in accordance with display messages of the main menu and thus a plurality of menus of hierarchical structure are displayed successively. The touch panel 125 is operated on as-needed basis, thereby setting operation parameters which cannot be designated by the keys/switches on the control panel 127. All registration processes for the extension output system of facsimile reception/transmission documents in the present invention may be executed by the operation of the touch panel 125.

The touch panel 125 is formed such that transparent conductive films having uniform resistance are coated on both side surfaces of a transparent glass substrate and a circuit network and electrodes for X-directional and Y-directional position detection are provided on the glass substrate. When the touch panel 125 is touched by an exclusive-use conductive pen 128, the resistance value of the portion of the conductive film near the touched area varies, and a current flowing in the circuit network or a resistance varies. Information on the variation of the current is output from the touch panel 125.

Figure 8:
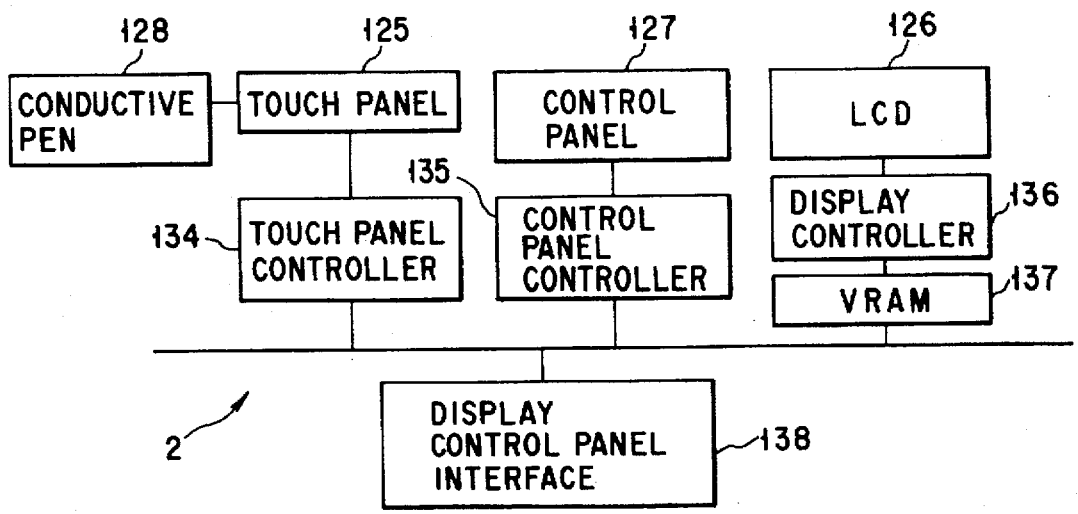

As is shown in FIG. 8, the operation panel 2 has a touch panel controller 134 for supplying power to the touch panel 125, reading current value variation information from the circuit network successively, converting the read information to positional coordinates and setting the positional coordinates in a register (buffer) within the controller. In fact, the touch panel 125 covers the display 126, and the display image on the display is viewed through the touch panel. On the other hand, the touch panel 125 is touched when the operator touches a region on the display screen by the pen 128 or the finger.

The display unit comprises the LC display 126, a display controller 136 and a VRAM (video memory) 137 for holding image data on a pixel unit basis. The display controller 136 reads out data from the VRAM 137 successively and displays the read-out data on the LCD 126. The switch on/off control on the control panel 127 is performed by a control panel controller 135.

The touch panel 125, display 126 and control panel 127 are all controlled by a CPU 92 via a display control panel interface 138 of the operation panel 2. Programs written in the ROM or magnetic disk in the main memory 94 are successively run by using a working memory or RAM. Such programs include principally a program for preparing menu screen data and setting the menu screen data in the VRAM 137, thereby to display the menu on the LCD 126, and a program for identifying an item, if selected by touching the touch panel 125, from the relationship between the touched position on the touch panel 125 and displayed data, thereby to perform an associated operation such as a display operation.

FIGS. 9A to 9D show schematically the map structure of the main memory 94. The main memory 94 generally comprises, as shown in FIG. 9A, a program ROM 140 for storing programs for various system controls, a data table ROM 141 for storing various control/management data, a working RAM 142 for executing programs in the ROM and temporarily storing various control/management data, and a touch panel/display auxiliary VRAM 143 for the touch panel/display.

As is shown in FIG. 9B, the program ROM 140 comprises a system control/management program unit 140a, a program unit 140b for controlling the touch panel/display control panel, a program unit 140c for controlling the magneto-optical disk apparatus (MOD), and a program unit 140d for input unit/output unit control.

As is shown in FIG. 9C, the data table ROM 141 comprises a data table unit 141a for system control, a data table unit 141b for controlling the touch panel/display control panel, a magneto-optical disk apparatus control/magneto-optical disk format data unit 141c, an input/output control data unit 141d, a facsimile control data unit 141e, and a character generator 141f.

As is shown in FIG. 9D, the working RAM 142 comprises a work area 142a for various control programs, a control work area 142b for controlling the touch panel/display control panel, and work areas 142c to 142e for controlling the magneto-optical disk storage device. Control programs which cannot be controlled by the main memory 94 and disk management information of the magnetic disk apparatus 86 are stored and managed by magnetic disks, etc. and are loaded and saved upon request from the system control program.

FIGS. 10A to 10D, FIGS. 11A to 11d and FIGS. 12A to 12D show storage formats of image data management data and image data itself in the magneto-optical disk 37. The same formats apply to the magnetic disk.

As is shown in FIG. 10A, the magneto-optical disk 37 comprises a file management area 150 for image data management on the magneto-optical disk; a document data area 151 for storing image data itself; a disk initialize format area 152 for storing initial defective addresses at the time of manufacturing the magneto-optical disk and at the time of initializing; a disk number area 153 for storing a disk number or an identification number of the magneto-optical disk; a password area 154 for storing a password of the owner of the magneto-optical disk; a disk initialize date area 155 for storing the date when the magneto-optical disk is initialized; a binder number area 156 for storing a binder number registered in the magneto-optical disk; a binder management area 157 for storing management information of various binders; and a document management area 158 for managing document information registered in each binder.

As is shown in FIG. 10B, the binder management area 157 comprises a binder name address area 157a for storing a top address of a binder name stored in a binder name area 157d (mentioned below); a binder management information address area 157b for storing a top address of document management information in each binder stored in the document management area 158; a binder attribute information area 157c for storing various attributes of each binder; and a binder name area 157d for storing the name of each binder.

Each of the areas 157a to 157d can register a plurality of binders. For example, in the present embodiment, an n-number of binders from binder number (1) 159a to binder number (n) 159n are registered in each area, as is shown in FIG. 10C. Since binder attribute information 160d (mentioned below) has an area for storing a storage format, the binder name area 157d can store, as binder names, desired storage formats of character codes, compressed codes of bit image information, etc.

The binder attribute information area of each binder in the binder attribute information area 157c has a structure, as shown in FIG. 10D. Specifically, the attribute information area comprises a binder identification (ID) number area 160a for storing an ID number of the binder; a binder registration date area 160b for storing the date when the binder is registered; a document file number area 160c for storing the number of documents registered in the binder; and a binder attribute information area 160d for storing a storage format (e.g. character code format, bit image format, etc.) of binder name and binder management information, e.g. whether a binder is one for a facsimile transmission/reception document. In the embodiment, binder number (1) 159a to binder number (n) 159n, as shown in FIG. 10C, are used as binder ID numbers.

FIGS. 11A to 11D and FIGS. 12A to 12D show detailed structures of the document management area 158. As is shown in FIG. 11A, the document management area 158 manages document management information areas of, e.g. an n-number of binders from binder number (1) to binder number (n).

For example, as is shown in FIG. 11B, the document management information area 161 of the binder 1 comprises a document name address region 161a for storing a top address at which the name of a document registered in the binder is stored; a document management information address area 161b for storing a top address of page-unit management information of each document stored in a page information area 161e; a document attribute information area 161c for storing various attributes of each document; a document name area 161d for storing the document name of a registered document; a page information area 161e for storing page-unit information of a registered document; and an option information area 161f for storing option information in units of a document.

Information of the associated documents Nos. 1 to n is registered in the respective regions, for example, as indicated by document attribute information 162a to 162n shown in FIG. 11C.

Information is input to the document name area 161d via the operation panel 2, for example, by means of the exclusive-use conductive pen 128. The document name area 161d can store, for example, a bit image digitized to a predetermined information quantity by a predetermined control system. The area 161d constitutes a storage section for storing a document name searched as document ID information at the time of registered image data search.

The attribute information of each document in the document attribute information area 161c is constructed, for example, as shown in FIG. 11D. A document ID number 163a is a number proper to the document, which is assigned automatically, for example, in the order of registration in the magneto-optical disk 37 at the time of registration. In the embodiment, the document ID number 163a is expressed by document number, (1) to (n), as shown in FIG. 11C. A document registration date 163c is an area where the date on which the document is registered is stored, a page number 163b is an area where the number of pages of the document is stored, and a document size 163d is an area where the size of the registered document is stored. Even if original documents of various sizes are included in the document, a proper code indicating that the original document size differs from page to page is stored in the document size 163d. The original document size of each page may be stored in a page information area 163g.

A document attribute management information area 163e stores a name storage format (e.g. character code format or bit image format) and document attribute/management information (e.g. the type of linear density). As is shown in FIG. 12A, an extension process information area 163f comprises an area 164 for storing document type data (e.g. whether the document is intended for filing or facsimile transmission), a page edit mode information area 165 for recording information on whether page edit is to be performed, and an electronic sort information area 166 for recording information on whether electronic sort is to be performed.

As is shown in FIG. 12B, a page attribute information area 163g records attribute information units 164a to 164n associated with page 1 to page n of the document. For example, regarding page 1 as shown in FIG. 12C, the attribute information of each page includes an original document kind information area 165a, an original document size information area 165b and an edit-at-output-time information area 165c. Further, as shown in FIG. 12D, the edit-at-output-time information area 165c includes a pattern information area 166a for storing information on a page coupling/division process to be performed at the time of output, an overlay information area 166b relating to pattern overlay, a variable magnification information area 166c for setting a variable magnification at the time of converting resolution and size, an output sheet size information area 166d for recording an output sheet size, and an output resolution information area 166e for recording an output resolution.

As regards the image forming apparatus having the above structure, the document registration procedure, document search procedure and document output procedure in the filing operation mode, facsimile accumulation transmission mode and electronic sort mode will now be described. All operations of the system components, as described below, are controlled by the control unit 80.

Figure 13A:
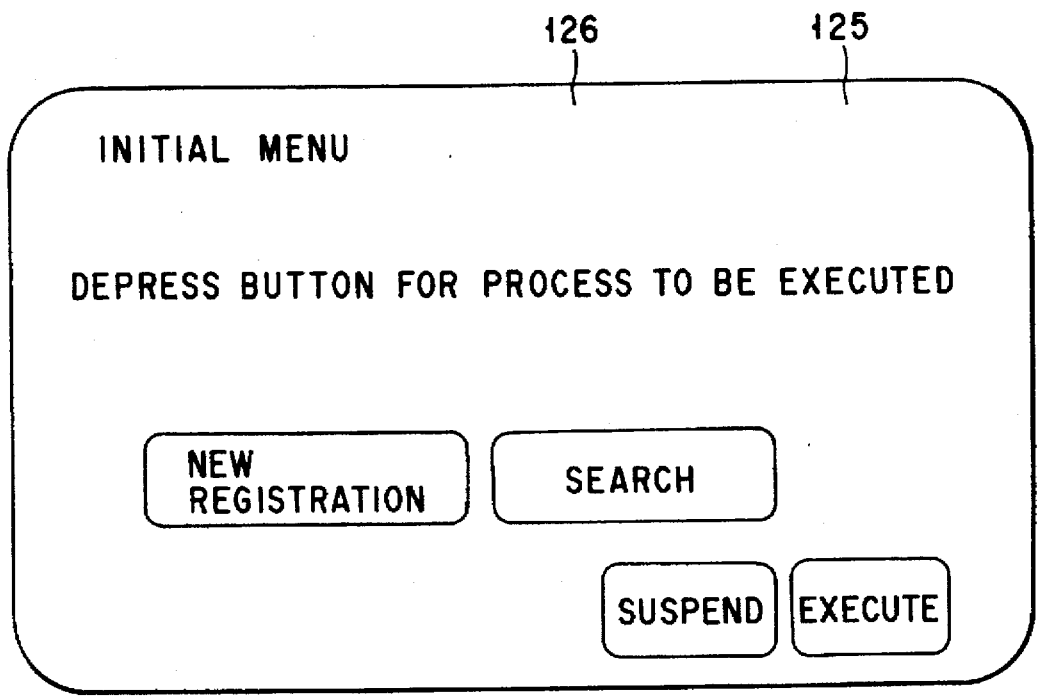
Figure 13B:
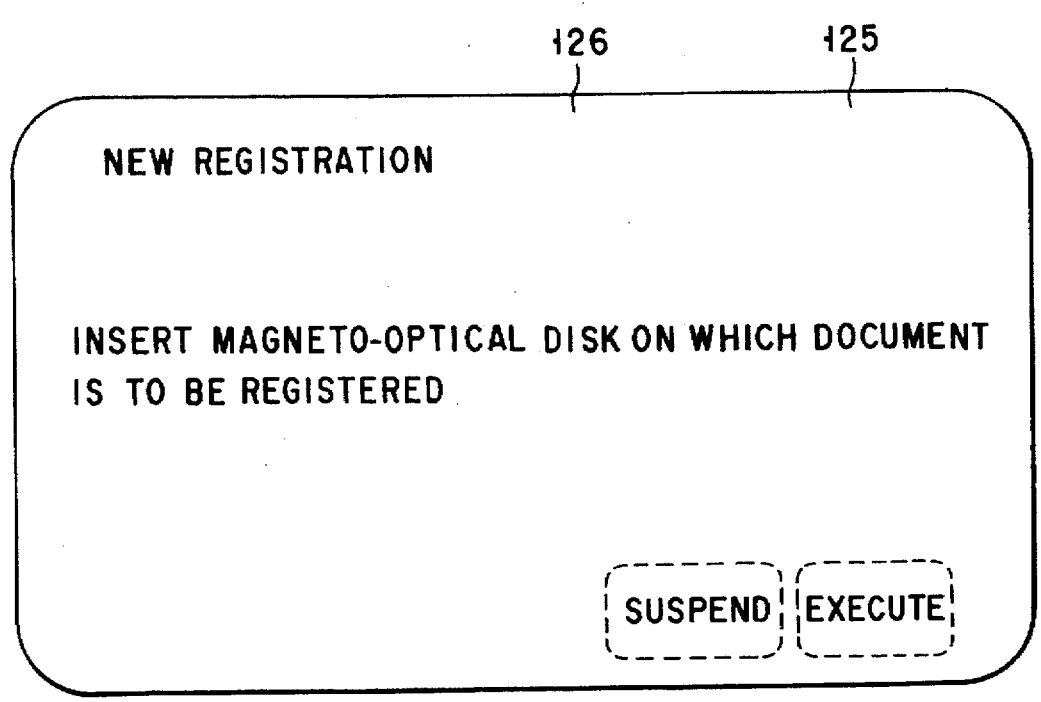

The registration of documents will first be described. When a new document is registered, [new registration] is selected according to an initial menu displayed on the display 126 of the operation panel 2, as shown in FIG. 13A. Then, the display 126 displays a new registration screen, as shown in FIG. 13B, and a desired magneto-optical disk is inserted into the magneto-optical disk apparatus 36. Subsequently, as shown in FIG. 13C, a binder designation screen is displayed and a chosen number key is touched to designate a binder name.

If the binder name is designated, a file designation screen is displayed, as shown in FIG. 13D. A desired file name is input on the display screen. The input of the file name is effected by touching alphabetical keys displayed on the touch panel 125. If erroneous input is done, a DEL key is touched to correct the input data on a character-by-character basis.

Figure 13E:
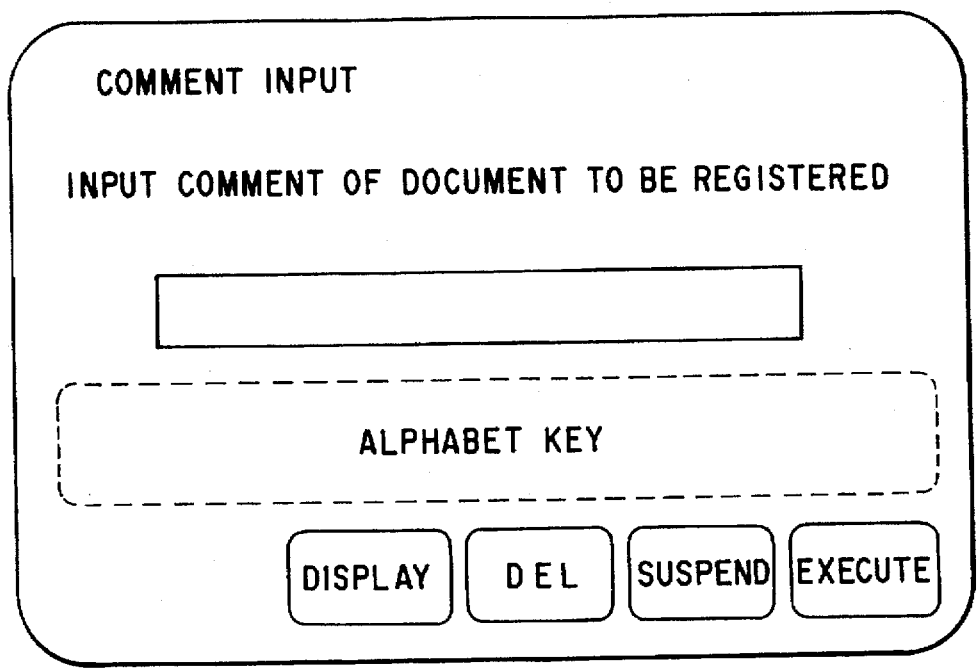
Figure 13F:
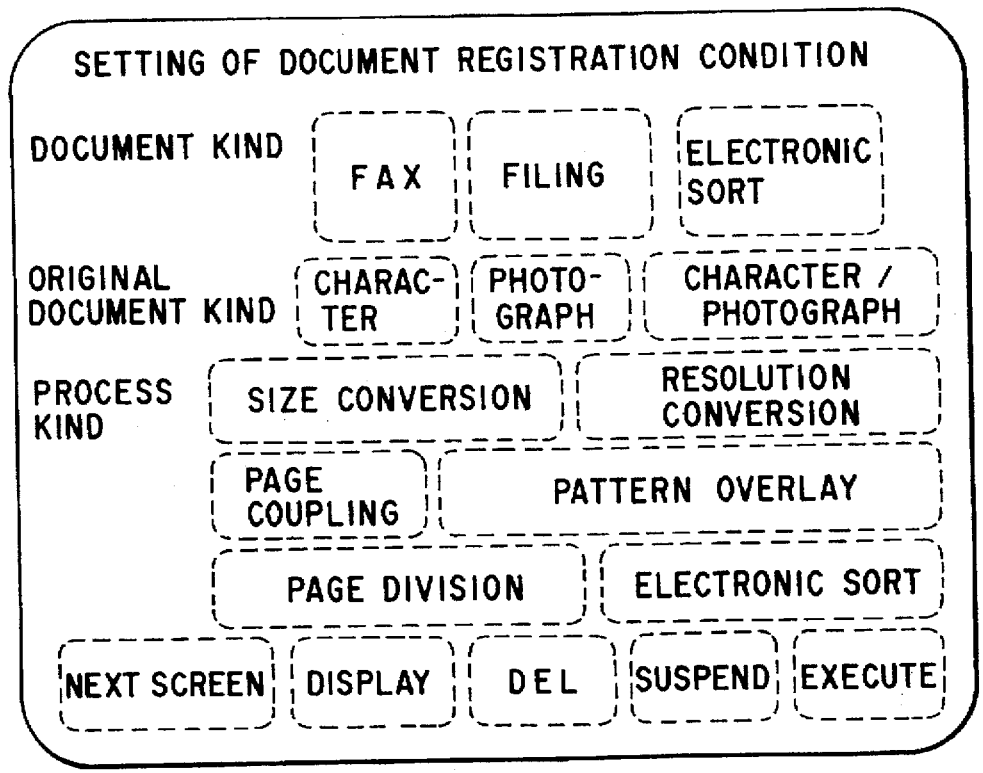

After the designation of the file name, a comment input screen is displayed, as shown in FIG. 13E, and comments on the file are input in the same manner as mentioned above on an as-needed basis. If the file name is not input, a default document name such as "untitled" is input. The designated file name is stored in the document name area 161d shown in FIG. 11B. If a suspension key on the touch panel 125 is touched, the new document registration process is suspended and the initial menu is restored. If an end key on the touch panel 125 is touched, the file name input process is completed and a menu screen for setting of document registration condition is displayed, as shown in FIG. 13F.

The document kind (filing document, facsimile transmission document, electronic sort document), the original document kind and the edit process kind are selected on the display screen and designed by touching a desired key.

In the present apparatus, the following edit process can be designated. The display 126 displays various screens according to the designated edit process. On the basis of the display screens, more specified designation is performed, as described below.

Size Conversion Process (Size Conversion Rate 25% to 400%

In the present process, input image data is converted to a proper size according to a designated conversion ratio and an output sheet size. When the present process is selected, a size conversion setting screen is displayed on the display 126, as shown in FIG. 14A. According to the display screen, the size conversion ratios in the main operation direction X and sub-operation direction Y are input through the operation panel 2, and the output sheet size can be designated.

Resolution Conversion Process

In the present process, the input image data is converted to a resolution designated through the operation panel 2 or corresponding to the function of a destination-side facsimile apparatus. If the present process is selected, a resolution conversion setting screen is displayed on the display 126, as shown in FIG. 14B. A chosen key is touched to designate a desired resolution of 200 dpi, 300 dpi, etc. If no resolution is designated, a resolution of 400 dpi is chosen.

Rotational Process

In the present process, if a facsimile document or portrait is designated and an input image page memory size is "A4" or the PM size set in the 2-in-1 or 4-in-1 is A4, B4 or A3, the image is rotated by 90°. This process is automatically set according to the designated edit process.

Page Coupling Process

Figure 14E:
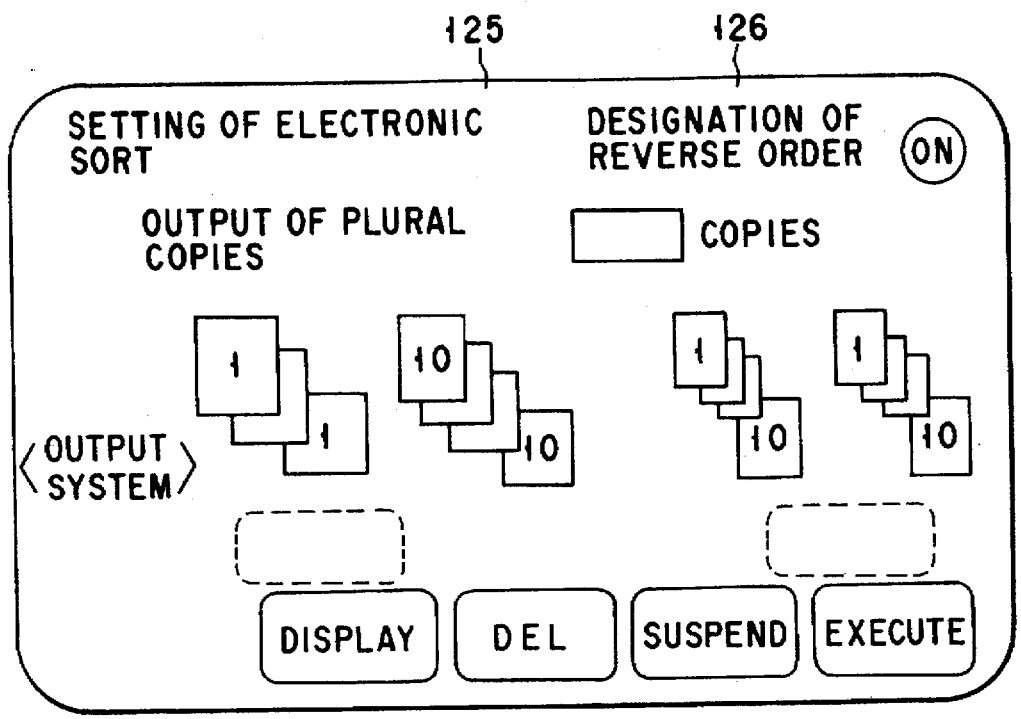
Figure 15A:
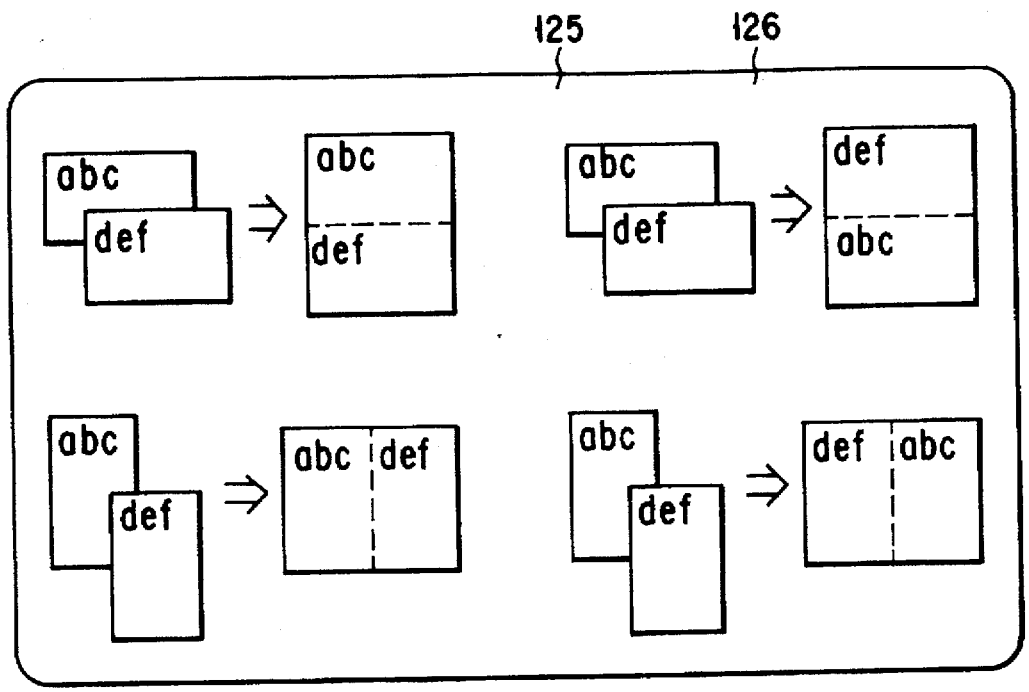
FIGS. 15A and 15B are plan views showing patterns of page coupling processing, displayed on the LC display.
Figure 15B:
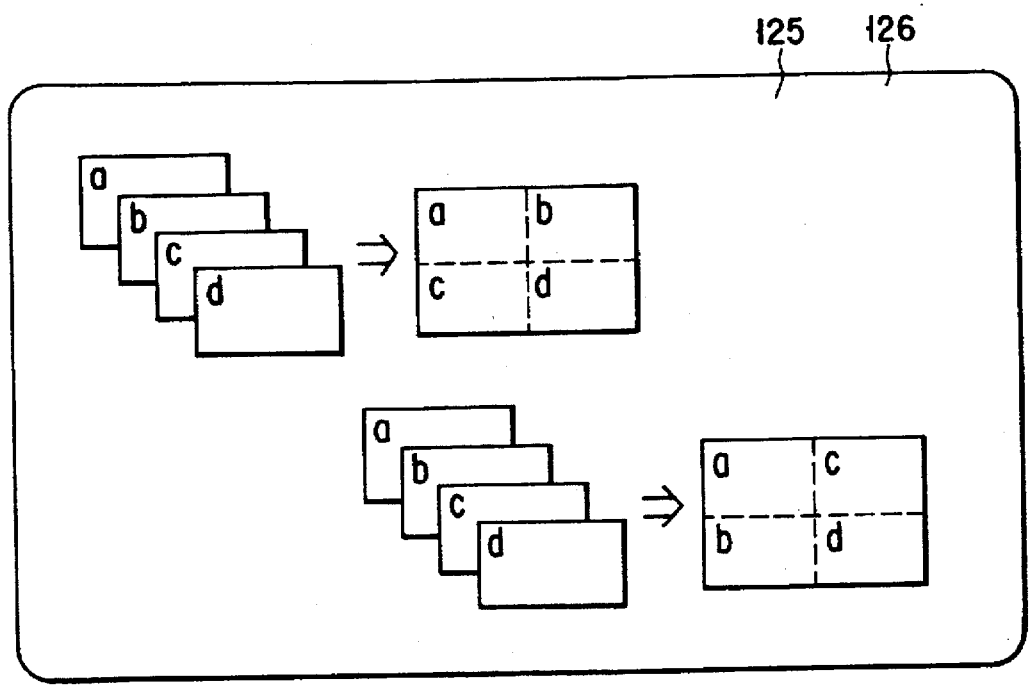

In the present process, a plurality of original documents, e.g. two or four documents, are arranged as one sheet and output. Hereinafter, a process of coupling two pages into one page is called a "2-in-1" process and a process of coupling four pages into one page is called a "4-in-1" process. When the present process is designated, a process screen as shown in FIG. 14C is displayed and a chosen key is touched to designate the 2-in-1 process or 4-in-1 process. In the 2-in-1 process and 4-in-1 process, two or more kinds of write orders and write arrangements are set. When the 2-in-1 process is designated, four patterns as shown in FIG. 15A are displayed on the display 26. When the 4-in-1 process is designated, two patterns as shown in FIG. 15B are displayed on the display 126. A desired pattern can be designated through the touch panel 125.

In addition, a process of arranging read original documents on both sides of an output sheet may be performed. For example, eight original documents may be arranged on both sides of an output sheet in units of four.

Page Division Process

In the present process, one original document is divided and output to two or four output sheets. Hereinafter, a process of dividing one original document and outputting the divided documents to two output sheets is called a "1-out-2" process, and a process of dividing one original document and outputting the divided documents to four output sheets is called a "1-out-4" process. If the present process is designated, a process screen as shown in FIG. 14C is displayed and a chosen key is touched to designate the 1-out-2 process or 1-out-4 process. A plurality of patterns are preset according to the write orders of the 1-out-2 and 1-out-4 processes. If the 1-out-2 process or 1-out-4 process is designated, each pattern (not shown) is displayed on the touch panel 125 and a desired pattern can be designated.

Pattern Overlay

In the present process, image patterns used as standards for synthesis are accompanied with names and pre-stored in the magnetic disk, magneto-optical disk 37 or RAM. An image pattern designated by the operator is once developed in the page memory unit 84, overlaid on the read original image, and output. The position of overlay can be selected from among six positions: an upper left position, an upper center position, an upper right position, a lower left position, a lower center position, and a lower right position.

If this process is designated, a pattern overlay setting screen as shown in FIG. 14D is displayed on the touch panel 125, and a list of reference pattern names and overlay positions are displayed. If a desired reference pattern and a desired overlay position are designated, the designated reference pattern is developed and displayed on the touch panel 125. If a confirmation key is depressed, the address of the memory at which the reference pattern is stored is recorded on the overlay information area 166b shown in FIG. 12D.

Electronic Sort

In the present process, software-based sorting operations are performed. For example, the order of 10 output is changed such that a lately input document is output at first. In addition, a plurality of output sheets corresponding to a plurality of original documents are output. The change of output order is principally utilized at the time of the input operation using the last-page-first type ADF 7. When this process is designated, an electronic sort setting screen as shown in FIG. 14E is displayed on the touch panel 125 and a chosen displayed key is touched to determine whether the order of output should be reversed, how many sheets associated with one original document should be output, the same page should be output at a time, and whether a series of output operations should be repeated two or more times and a plurality of documents arranged in the order of pages should be produced.

Figure 14F:
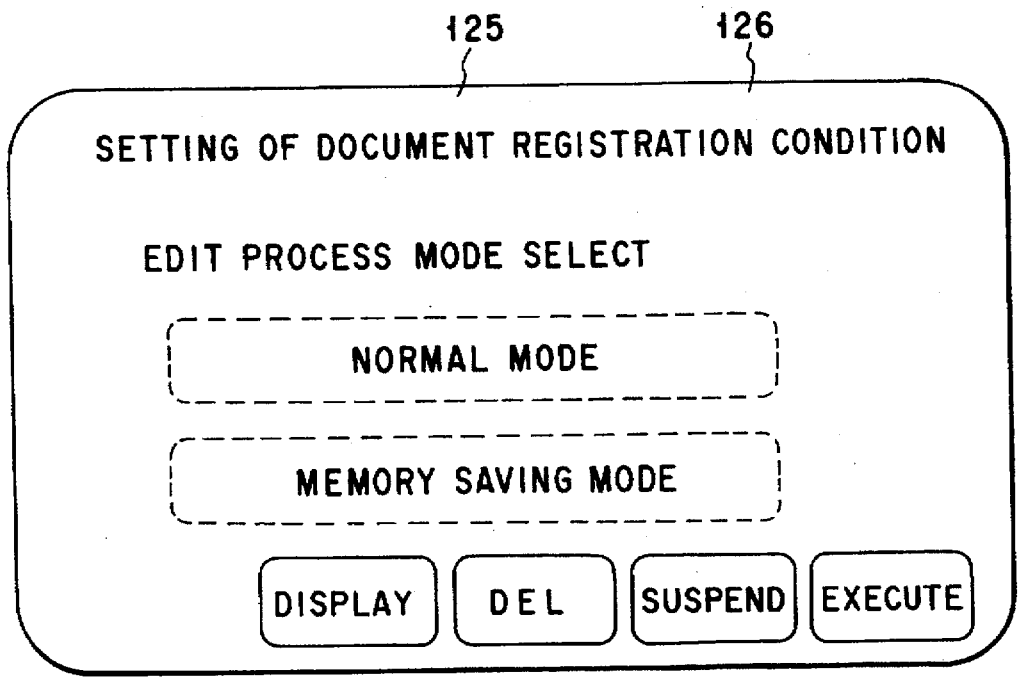

If the above edit processes have been set, the touch panel 125 displays a document registration condition setting screen as shown in FIG. 14F. According to this screen, a normal mode or a memory saving mode is designated.

If the execution button on the operation panel is depressed after the setting of the above edit processes, the touch panel 125 displays a registration condition confirmation screen (not shown). The confirmation screen displays a binder name of a destination of registration, a file name, an output sheet size or size conversion ratio, and a designated edit process name. When detailed information of each process is to be confirmed, a detailed information button is depressed to display and confirm the detailed information.

If there is a portion to be corrected, a suspension button is depressed to suspend the registration process. Thus, the registration operation is performed once again from the beginning. If the displayed conditions are agreeable, the original document is set on the original document table 12 or the original document tray 8 of the ADF 7, and the start button is depressed. Thereby, the scanner 4 starts to operate and the document registration process begins.

In the document registration process, it is necessary to record registered document identification (ID) information in the file management area of the magnetic disk or magneto-optical disk 37. Thus, the document number 160c of the binder designated as a destination of registration is searched to count up the number of registered documents, and the document ID number in the binder is obtained and the registration document name and comments are registered in the document name area 161d. Furthermore, the document ID number and registration date are registered in the document ID number area 163a and registration date information area 163c of the document attribute information area.

Specifically, the document file number 160c in the binder management area 157 is actually updated, the new document ID number is issued, the address of the associated document name area 161d is registered in the document name address area 161a corresponding to the new document ID number 163a, and the file name and comments are registered in the associated document name area.

The addresses of the associated document attribute information area 161c and document data area 151 are registered in the associated document management information address area 161b. The document attribute information 163e such as document ID number 162a, document registration date 162c and document size 165b is registered in the associated document attribute information area 161c under the control of the control unit 80.

The document information input by the scanner 4 is digitally compressed and registered in the associated document data area 151. An example of the compression method is an MMR (modified modified read). The top address of the document information is stored in the associated portion of the document management information address area 161b on a page-by-page basis. In the case of the input from the original document table, the edit process can be altered on a page-by-page basis. The information of each page is registered and managed in the page attribute information area 163g.

In the case of registration from the original document table 12, the next document is set within a predetermined time period after the scanner 4 completes a read operation. If the start button is depressed, it is determined that the next document is present. In the case of registration with use of the ADF 7, the presence of the next document is determined if the document remains in the ADF. If it is determined that there is no next document, the registration process is completed.

Furthermore, another document may be added to the already registered document. In this case, "search" is selected on the initial menu of the LC display 126. The binder is selected according to the menu. The name of a document including a sentence to be added is selected from the displayed file names. Responding to the selection, the control unit 80 searches the magnetic disk or magneto-optical disk 37 and makes the display 126 display information units such as the page number 162b, edit process designation, etc. stored in the associated document attribute information area 161c. Thereby, the information relating to the selected document can be confirmed. In addition, by depressing the "display key" on the touch panel 125, the first page of the selected document is displayed on the LC display 70 and the contents of the document can be confirmed.

Thereafter, the addition button on the touch panel 125 is depressed, and the document to be added is set according to the instruction displayed on the LCD 126. Then, the start button is depressed to add the document information. The count-up of the page number, registration of the original document size and the designation of the edit process are performed in the same manner as with the new registration.

On the other hand, the document data read by the scanner 4 is developed in the page memory unit 84 via the scanner interface 81 and image bus 91. Thereafter, the document data is digitally compressed in the digitizing image processing unit 82 and successively stored in the storage medium set in the magneto-optical disk apparatus 36 or magnetic disk apparatus 86 via the system bus 90 and magneto-optical disk interface 97 or magnetic disk interface 96.

The output procedure of the registered document will now be described. At the time the registration process for all documents has been completed, the document output menu is displayed on the display 126. The document output menu shows only the file name of the currently registered document and that portion of the designated process contents, which is variable at the time of output, with reference to the document kind information 164, etc. The edit process contents are altered at this stage, if the operator wishes such alteration.

When printing is to be effected, the start button is depressed. Alternatively, when the facsimile transmission is performed, the telephone number of the destination of transmission is set and then the start button is depressed. Thus, the digitally compressed document data stored in the document data area 151 of the magneto-optical disk 36 or magnetic disk is output to the system bus 90 via the magnetic disk interface 96 or magneto-optical disk interface 97 under the control of the control unit 80. Thereafter, the document data is subjected to decoding in the digitizing image processing unit 82 and, if necessary, to size conversion, page coupling processing, page division processing and pattern overlay processing. The document data is then developed in the image memory unit via the image bus 91. Subsequently, the document data is subjected to the designated edit process and printed out by the printer 6 via the printer interface 85 or transmitted via the facsimile board.

If the output process is not performed immediately, the suspension button on the touch panel is depressed, thereby finishing the operation without performing the printing or facsimile transmission process. If the output process is performed subsequently, "search" in the initial menu is selected, data on the document to be printed is fetched in the same manner as with the above-described additional document registration. This output process is performed in the same manner as with the above-described output process method.

The status of the document data output is displayed at any time on the message display unit of the display 126. If the output process is completed normally, or the suspension key is selected, the initial menu is restored. The output process can be suspended by depressing the stop key on the operation panel 2.

In the prior art, the magnification varying process in the above-mentioned series of processes is executed by using the image process unit 83 or the CODEC 109 in the digitizing image process unit 82. On the other hand, according to the image forming apparatus of the present embodiment, the magnification varying process is performed in part at the time of the registration process, as in the prior art, and it is not performed in the other part at the time of the registration process and the data on the magnification varying process is only stored in the document attribute information area 110c.

More specifically, according to the image forming apparatus of the present embodiment, the magnification varying process, i.e. resolution conversion process and size conversion process, is performed by two methods, as shown in FIGS. 16 to 19. In one method, document image data read by the scanner S is subjected to quantizing and digitizing processing by the image processing unit 83. In the other method, the digitized image is processed by the PDC 111. If the enlargement process is performed by the PDC 111, the image quality tends to deteriorate. Thus, the image quality is higher when the magnification varying process is performed by the image processing unit 83 at the time of registration than when the magnification varying process is performed by the PDC 111 at the time of output.

Figure 16:
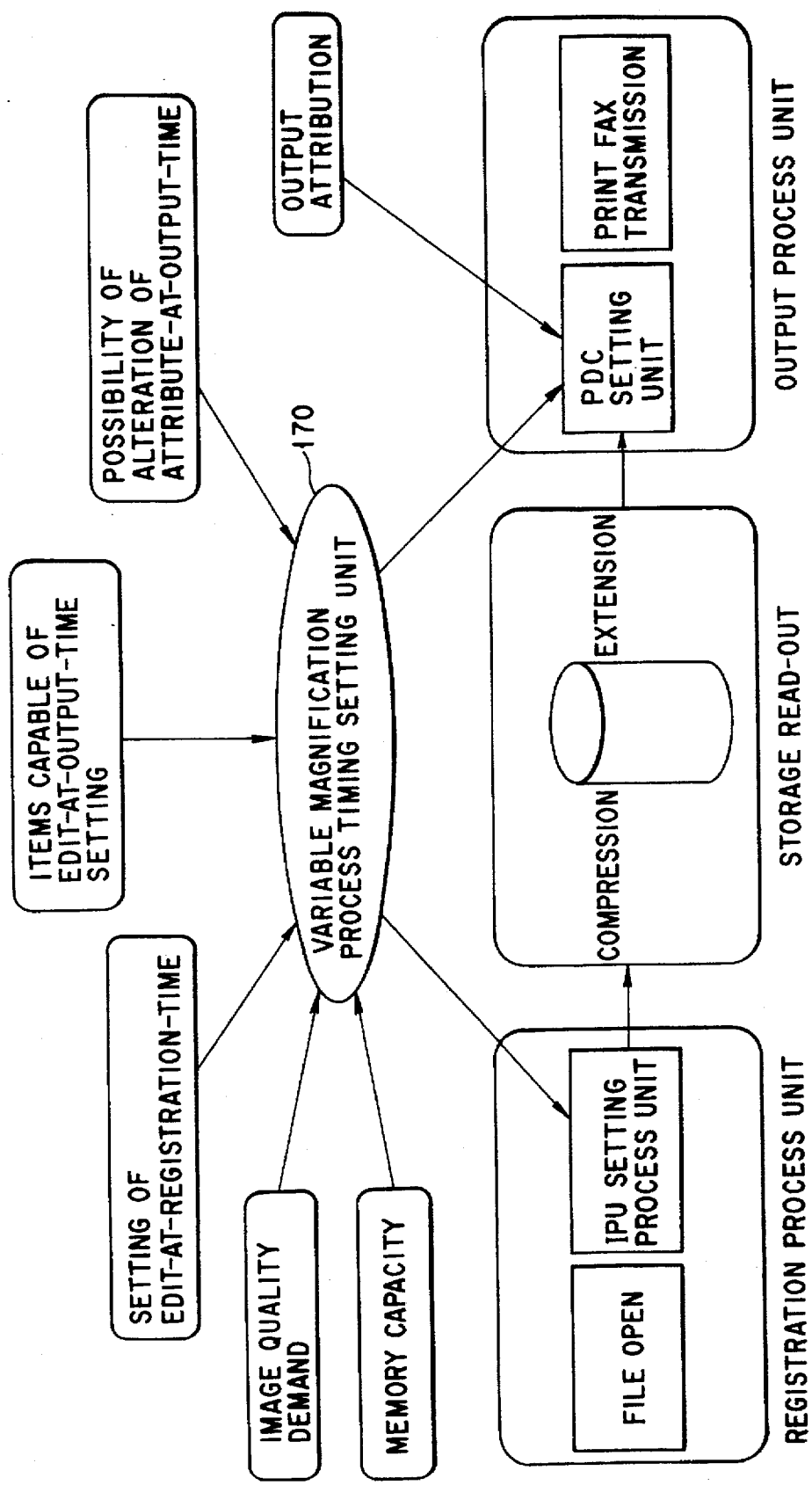
Figure 17:
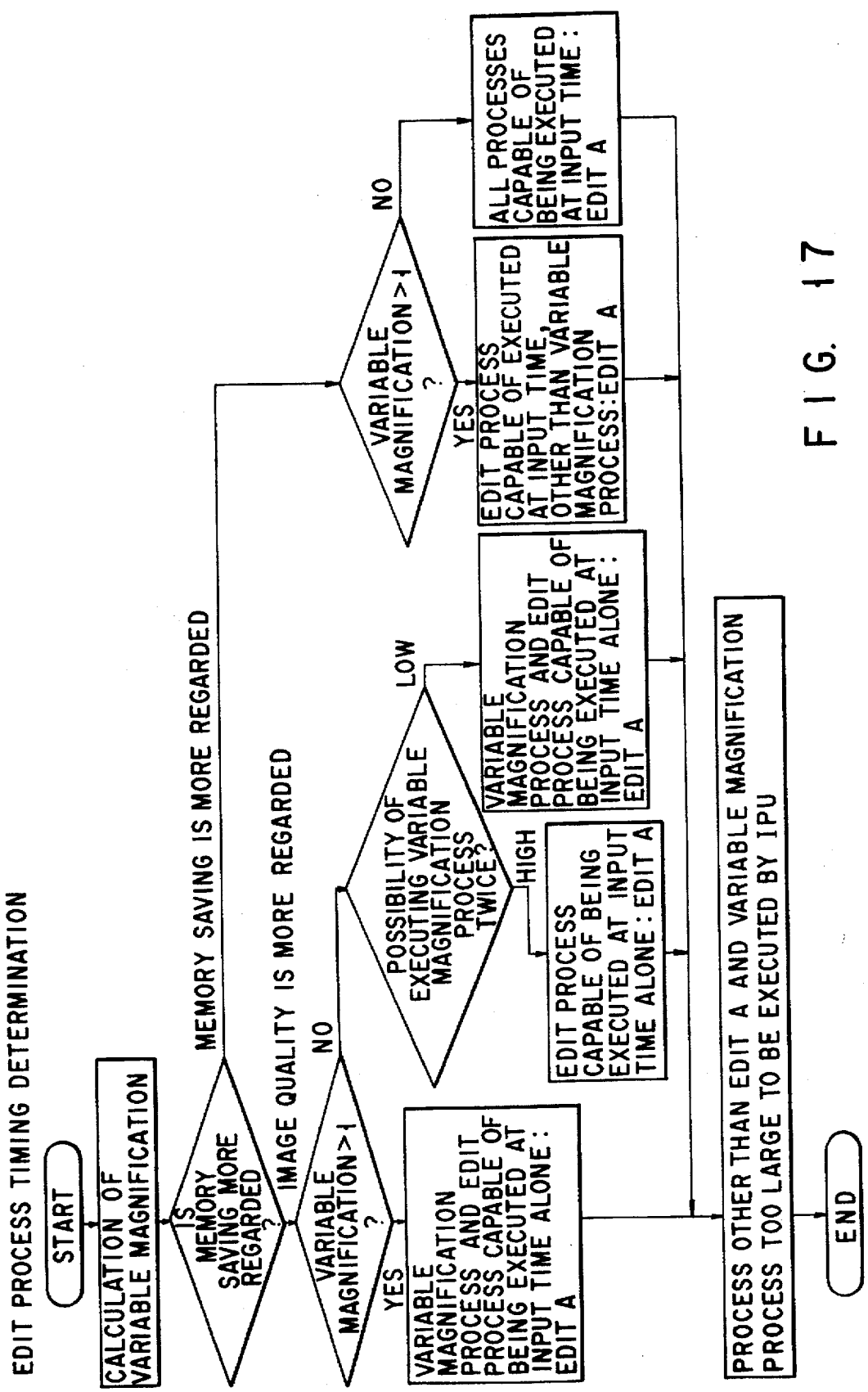

The image forming apparatus according to the present embodiment includes a variable magnification process timing setting unit 170, as shown in FIG. 16, in order to perform the editing set at the time of registration/output in either of the two methods, depending on the nature of the document. The variable magnification process timing setting unit 170 determines, as shown in FIG. 17, whether the process should be performed by the image processing unit 83 at the time of registration or the process should be performed by the PDC 111 at the time of the output process, on the basis of the information as to whether the operator puts stress upon the maintenance of the image quality or upon the saving of the memory capacity, and the information relating to the contents of the edit process designated at the time of registration, items capable of being set for editing at the time of output, and possibility of alteration of editing at the time of output.

If it is highly possible that the magnification varying process is performed twice, i.e. at the time of input and at the time of output, for example, if the output is not effected immediately, the magnification varying process is not performed at the time of input and the magnification varying process is performed once at the time of output.

If the possibility of performing the magnification varying process at the time of output is low or if the magnification set at the time of input is 1 or more, the process is performed at the time of input. In this case, the data on the performed edit process is not stored in the document attribute information area 161c.

If the magnification varying process cannot be completed in one process, for example, if the required reduction ratio does not fall within the feasible range of the image processing unit 83, the magnification varying process is performed twice at the times of input and output.

In the case of performing page coupling, the magnification varying process accords with the above principle.

However, the process of arranging two or more pages on a single sheet is in principle performed at the time of the output process. This, however, does not apply to the memory saving document, mentioned below.

Figure 18:
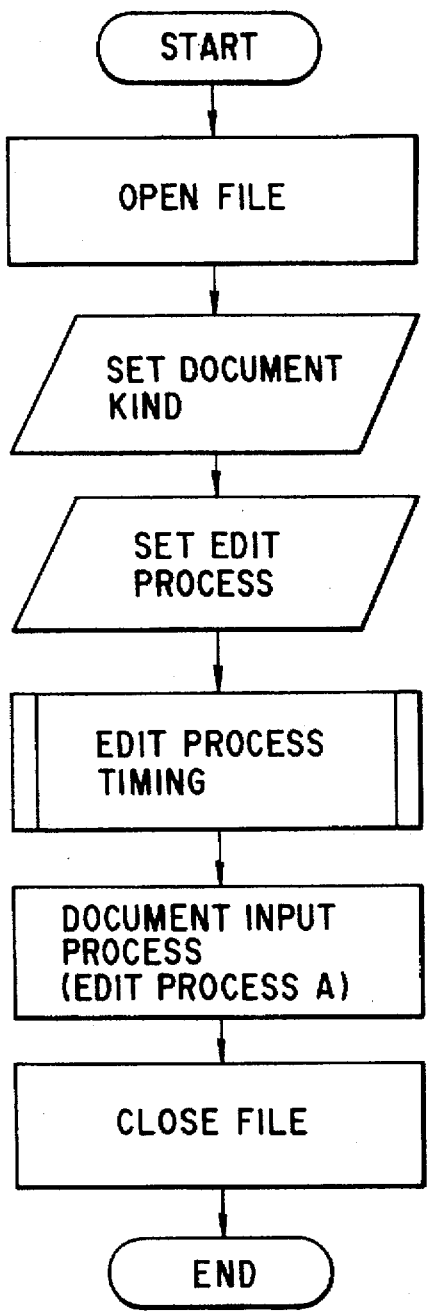
Figure 19:
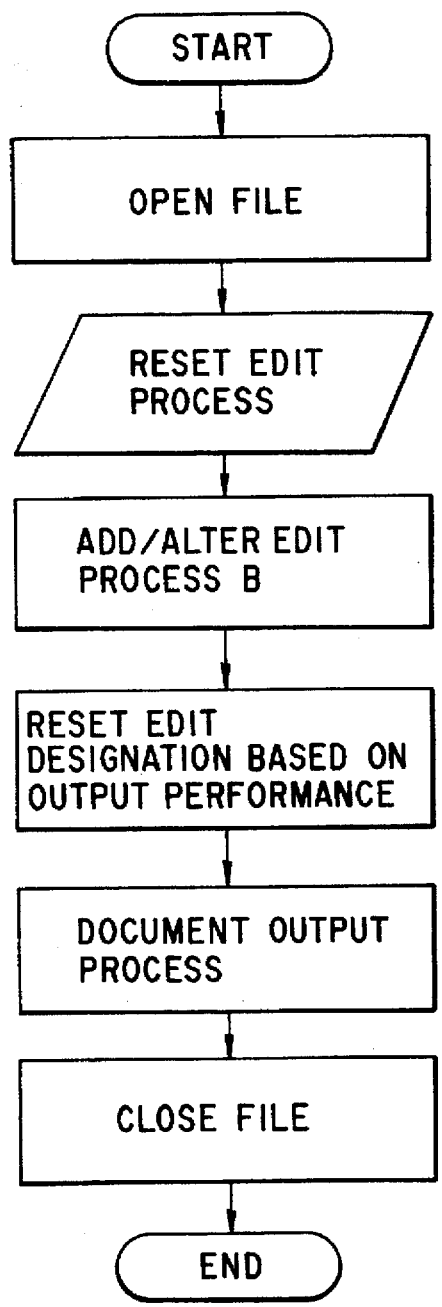

FIGS. 18 and 19 illustrate schematically the process flow of the image forming apparatus reflecting the above standards.

In this embodiment, documents to be processed by the apparatus are classified into the following four groups according to the use of the documents.

Filing Document: A document to be kept in a magneto-optical disk or a magnetic disk. Since this document is designed on the premise that the input and output are not performed simultaneously, the document data is, in principle, not reduced at the time of input. However, if the memory capacity of the magneto-optical disk or magnetic disk decreases to a predetermined value, e.g. 20 MB or less, the process is temporarily suspended to save the memory capacity. The magnification varying process is performed from the top of the file, and the filing document may be forcibly changed to a memory saving document by performing the subsequent magnetification varying process for the original document at the time of input.

Electronic Sort Document: A document to be output immediately after input. Although the electronic sort document is not intended for storage, it is stored in a magneto-optical disk unless the erase process is performed.

Facsimile Transmission Document: A document to be output immediately after input. The facsimile transmission document is stored in a magneto-optical disk unless the erase process is performed.

Memory Saving Document: A document designated for memory saving by the operator, irrespective of the kind of document. A process of increasing data, for example, for increasing the magnification ratio up to 1 or more, is not performed at the time of the registration process. Such a process as to set the magnification ratio to 1 or less is performed. In this process, a page coupling process is also performed. In the case where the number of total pages of the document is not sure and the input process is performed by using the last-page-first type ADF 7, some problems will occur. In the present invention, means for solving such problems is provided, though the means is simple. This means will be described later.

The above classification of the document does not necessarily agree with the actual object of the document. For example, a document intended not for storage may be designated as a facsimile transmission document, if the document is not subjected to electronic sorting or edit processing at the time of output. Commonly to all documents excluding electronic sort documents, the magnification varying process is performed at the time of output in the case where there is a limit, in particular, an upper limit, to the resolution due to the function of the destination-side facsimile apparatus, and where a sheet cassette of a designated output size is not set in the apparatus and the forcible process with the currently set cassettes commanded despite warning. As regards the electronic sort document, when the cassette of the size designated at the time of registration is not set, an error message is issued to permit only the designation of the output sheet size of the set cassette size. The magnification varying process is performed at the time of output, in the case where data must be output to a sheet smaller than the designated output sheet size on the transmission destination side.

Figure 20:
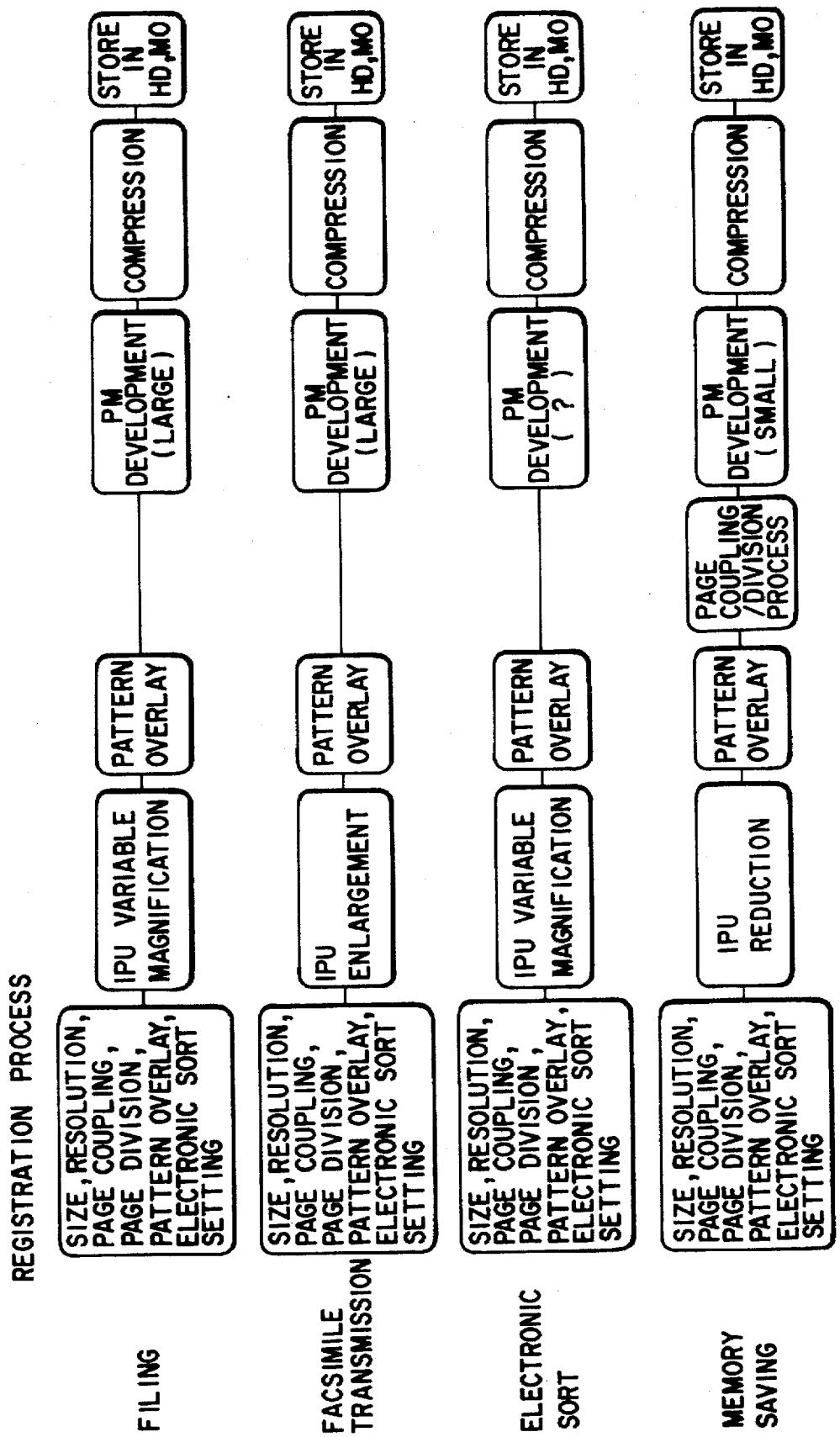
Figure 21:
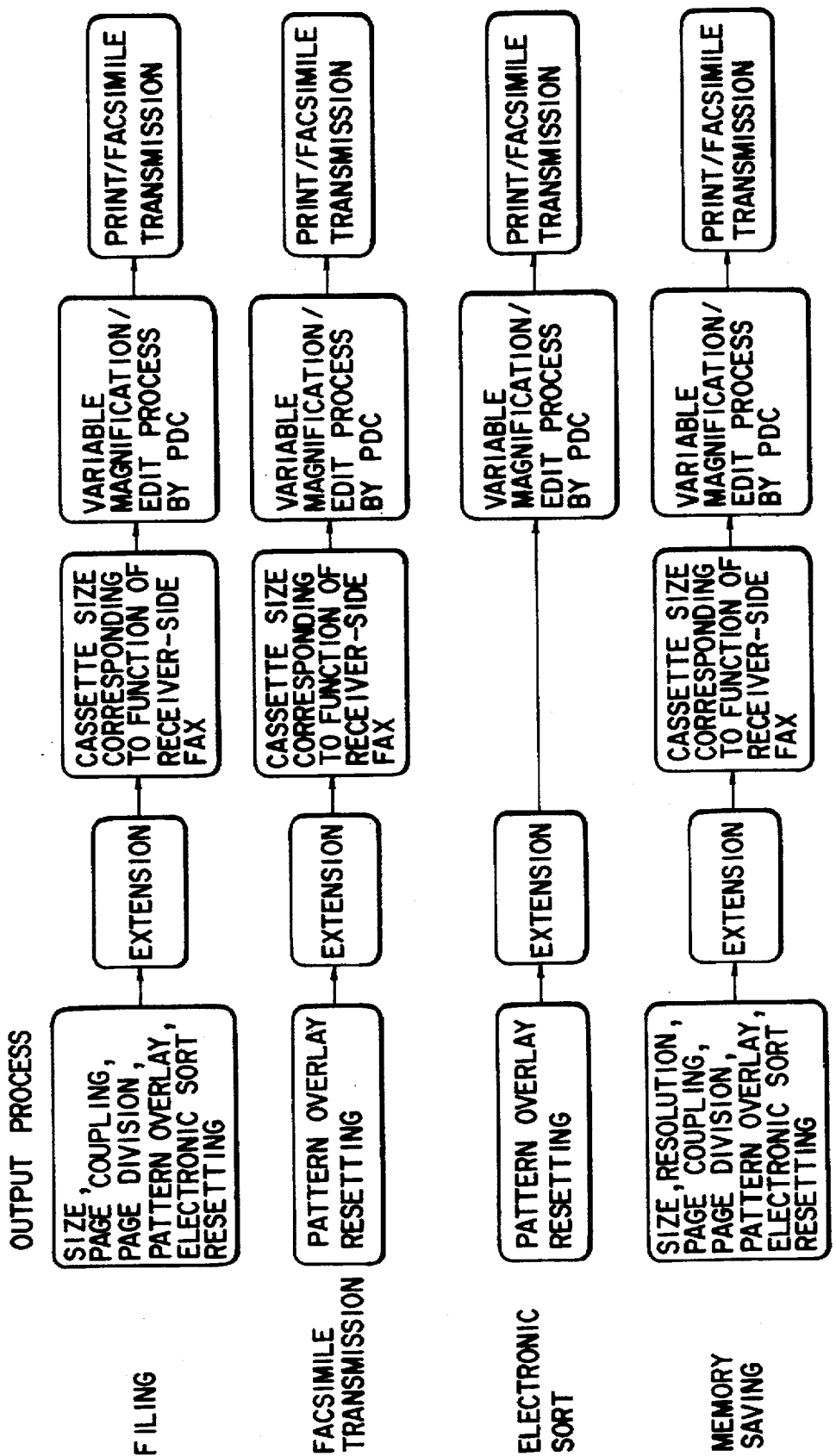

FIGS. 20 and 21 illustrate the edit process, the setting of the edit process for various documents and the timing of execution, in the apparatus of the present embodiment.

A description will now be given of, for example, the page coupling process for a memory saving document. As regards the memory saving document, the page coupling process is performed when the document is read by the scanner 4 and the read image data is recorded on a magnetic disk (HD) or a magneto-optical disk (MO) via the page memory unit 84.

Figure 22:
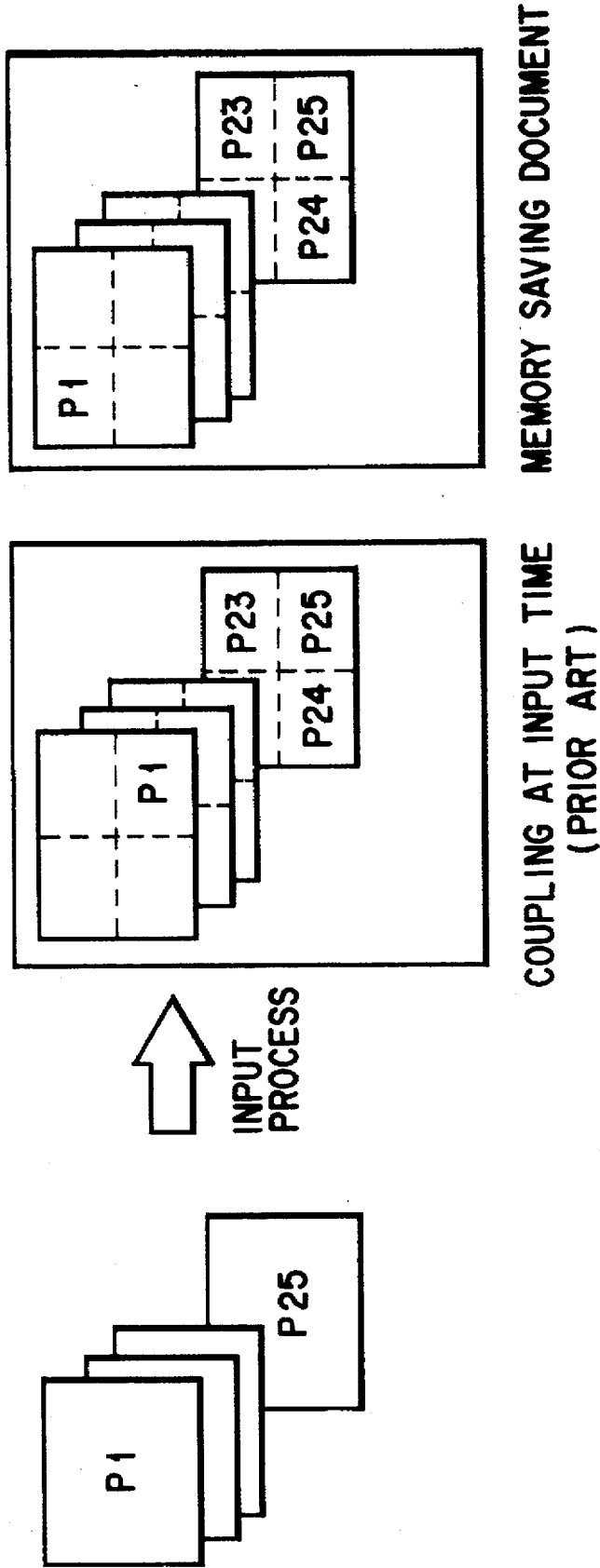

In the prior art, for example, when the 4-in-1 page coupling process is performed on 25 original documents set in the last-page-first type ADF 7, as shown in FIG. 22, a blank appears on the first page on which the first to third pages of the original document should appear. According to the present embodiment, when it is determined that there is no subsequent page, that is, when the original document of the first page has been read, the data stored in the top page is shifted within the page and re-stored at the proper place where the first page should be located. Thereby, the prior-art problem can be solved, though the means for solving the problem is simple.

For example, when the required reduction ratio does not fall within the feasible range of the image processing unit 83, the magnification varying process is performed in two parts at the time of input and output. FIG. 23 illustrates the control flow in this case.

For example, as regards the image forming apparatus wherein the size conversion process can be performed within a range of 25% to 400% at the time of input, if the reduction ratio designated or determined at the time of input falls outside the above range, the image data read by the scanner 4 is subjected to the magnification varying process at the time of input and subjected once again to the magnification varying process by the CODEC 109 of the image processing unit 83 at the time of output, i.e. at the time of image formation.

When a direction perpendicular to the direction of movement of the scanner 4 is set as a main scanning direction and the direction of movement of the scanner is set as a sub-scanning direction, the magnification varying process at the time of input is adjusted so that the magnification varying process is performed at the time of image formation with a magnification of 1/n (n=integer) in each scanning direction. For example, when the designated magnification ratio is 13% or more and less than 25%, the magnification varying process is performed at the time of input with a magnification of double the designated magnification in each scanning direction and the magnification varying process is performed at the time of output with a magnification of 50% of the designated magnification. Similarly, when the designated magnification ratio is 7% or more, and less than 13%, the magnification varying process is performed at the time of input with a magnification of four times the designated magnification in each scanning direction and the magnification varying process is performed at the time of output with a magnification of 25% of the designated magnification. Thereby, an image magnified at a designated magnification can be output at last.

Accordingly, the magnification varying process can be performed in a range exceeding a predetermined range, e.g. 7% to 400%. In addition, by adjusting the magnification ratio at the time of input so that the magnification ratio at the time of output may become 1/n (n=integer), the deterioration of output image due to culling of image can be reduced.

As has been described above in detail, according to the image forming apparatus having the above structure, it is determined whether the process with a magnification set at the time of input is performed at the time of input or at the time of output, in accordance with the purpose of the document and the capacity of the memory. If the magnification varying process is performed at the time of output, the contents of the process are only added to the document attribute information at the time of input and the designated process is performed at last at the time of output. Thus, unlike the prior art, the image quality is not degraded due to frequent variable magnification processes which are performed in the prior art since the edit process for all documents are performed in a batch manner at the time of the input process or output process.

The processes, the designation of which can be altered at the time of output, are limited in consideration of the processes which tend to be altered at the time of output, depending on the kind of document. Thereby, the complexity of performing the designation of the edit process twice at the time of input and output of the original document is reduced and the maneuverability can be enhanced.

Further, kinds of documents are prepared in accordance with the purposes of documents. In addition, the memory saving document for preferentially performing a process with a saved memory capacity is prepared as one of the kinds of documents, as a countermeasure to the deficiency in capacity of the magnetic disk, magneto-optical disk or work RAM. Thereby, processes with stress put on a greater number of registrable documents than on the image quality can be performed.

Besides, a process is provided to solve a problem to some extent without using many work RAMs, which problem occurs when the page coupling process of the memory saving document is performed by using the last-page-first type ADF. Thus, the output result of the edit process at the time the work RAMs or other memories become deficient can be enhanced.

Moreover, when the variable magnification falling outside the feasible range is designated at the time of input, the magnification varying process is performed twice at the time of input and output. Thereby, the magnification varying process can be performed beyond the feasible variable magnification range.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus comprising:

means for scanning an image on an original document;

means for storing image data of the image scanned by said scanning means in a storage medium;

means for reading out the image data from said storage medium;

means for forming an image on an image formation medium in accordance with one of the image data of the image scanned by said scanning means and the image data read out by said reading out means;

means for designating the content of an edit process for editing the image data so that an image different from the image on the original document is formed on the image formation medium by the forming means;

means for instructing a time at which the edit process designated by said designating means is executed, at least one of a time before storing the image data and a time after reading out the image data, said instructing means including means for determining the time at which the edit process is executed, in accordance with the possibility of a variable magnification process at a time of output based on the designated edit process and a variable magnification ratio designated by said designating means; and means for executing the edit process of the image data in accordance with the instruction by said instructing means, at one of a time before storing the image data in the storage medium and a time after reading out the image data.

2. An image forming apparatus comprising:

means for scanning an image on an original document;

means for storing image data of the image scanned by said scanning means in a storage medium;

means for reading out the image data from said storage medium;

means for forming an image on an image formation medium in accordance with one of the image data of the image scanned by said scanning means and the image data read out by said reading out means;

means for designating the content of an edit process for editing the image data so that an image different from the image on the original document is formed on the image formation medium by the forming means;

means for instructing a time at which the edit process designated by said designating means is executed, at least one of a time before storing the image data and a time after reading out the image data; and means for executing the edit process of the image data in accordance with the instruction by said instructing means, at one of a time before storing the image data in the storage medium and a time after reading out the image data, said executing means including means for causing said storing means to store the content of the edit process designated by said designating means in the storage medium, when the edit process at the time of image formation has been designated by said instructing means.

3. An image forming apparatus comprising:

means for scanning an image on an original document;

means for storing image data of the image scanned by said scanning means in a storage medium;

means for reading out the image data from said storage medium;

means for forming an image on an image formation medium in accordance with one of the image data of the image scanned by said scanning means and the image data read out by said reading out means;

means for designating the content of an edit process for editing the image data so that an image different from the image on the original document is formed on the image formation medium by the forming means;

means for instructing a time at which the edit process designated by said designating means is executed, at least one of a time before storing the image data and a time after reading out the image data;

means for executing the edit process of the image data in accordance with the instruction by said instructing means, at one of a time before storing the image data in the storage medium and a time after reading out the image data; and means for transmitting one of the image data of the image scanned by said scanning means and the image data read out by said reading out means;

said executing means including means for performing the edit process of the image data in accordance with the instruction by said instructing means, at one of a time before storing the image data in the storage medium, a time of forming the image by said image forming means, and a time of transmitting the image data by said transmitting means.

4. An apparatus according to claim 3, wherein said instructing means includes means for determining the time at which the edit process is executed, in accordance with the possibility of a variable magnification process at a time of output based on the designated edit process and a variable magnification ratio designated by said designating means.

5. An image forming apparatus comprising:

means for scanning an image on an original document;

means for storing image data of the image scanned by said scanning means in a storage medium;

means for reading out the image data from said storage medium;

means for forming an image on an image formation medium in accordance with one of the image data of the image scanned by said scanning means and the image data read out by said reading out means;

means for designating the content of an edit process for editing the image data so that an image different from the image on the original document is formed on the image formation medium by the forming means;

means for selecting one of a saving mode and a normal mode of said storage medium;

means for instructing a time at which the edit process designated by said designating means is executed, at least one of a time before storing the image data and a time after reading out the image data;

first executing means for executing the edit process of the image data in accordance with the instruction by said instructing means, at one of a time before storing the image data in the storage medium and a time after reading out the image data; and second executing means for executing the edit process of the image data at the time before storing the image data in said storage medium, irrespective of the instruction by said instructing means, in one of the case where a memory capacity of the storage medium has decreased to a predetermined level and the case where the saving mode of the storage medium has been selected.

6. An apparatus according to claim 5, wherein said instructing means includes means for determining the time at which the edit process is executed, in accordance with the possibility of a variable magnification process at a time of output based on the designated edit process and a variable magnification ratio designated by said designating means.

7. An apparatus according to claim 5, further comprising means for successively feeding a plurality of documents set in a stacked manner from the last page to the scanning means;

third executing means for executing the edit process of the image data by coupling a plurality of image data into one image, at a time before storing the image data in said storage medium, irrespective of the instruction by said instructing means, in one of the case where a memory capacity of the storage medium has decreased to a predetermined level and the case where the saving mode of the storage medium has been selected; and means for altering the position of the coupled image data within said one image while the edit process is being executed by said third executing means and when the image data to be scanned by the scanning means and coupled has decreased to zero.

8. An image forming apparatus comprising:

means for scanning an image on an original document;

means for storing image data of the image scanned by said scanning means in a storage medium;

means for reading out the image data from said storage medium;

means for forming an image on an image formation medium in accordance with one of the image data of the image scanned by said scanning means and the image data read out by said reading out means;

means for designating the content of an edit process for editing the image data so that an image difference from the image on the original document is formed on the image formation medium by the forming means;

means for instructing a time at which the edit process designated by said designating means is executed, said instructing means including means for determining the time at which the edit process is executed, in accordance with the possibility of a variable magnification process at a time of output based on the designated edit process and a variable magnification ratio designated by said designating means; and means for executing the edit process of the image data in accordance with the instruction by said instructing means, at a time of storing the image data in the storage medium, at a time of forming the image by said image forming means, or at both times of storing the image data in the storage medium and forming the image by said forming means.

9. An image forming apparatus comprising:

means for scanning an image on an original document;

first process means for subjecting image data of the image scanned by said scanning means to a variable magnification process within a first range;

means for storing the image data of the image scanned by said scanning means in a storage medium;

means for reading out the image data from said storage medium;

second process means for subjecting the image data read out by said reading out means to the variable magnification process within a second range;

means for forming an image on an image formation medium in accordance with one of the image data of the image scanned by said scanning means and the image data read out by said reading out means;

means for designating a variable magnification ratio of the image data; and means for executing the variable magnification in two stages when the variable magnification ratio designated by said designating means falls out of said first range.

10. An apparatus according to claim 9, wherein said executing means comprises first execution means for executing the variable magnification process by said first process means at a variable magnification ratio corresponding to an integer-number of times of the designated variable magnification ratio, and second execution means for executing the variable magnification process by said second process means at a variable magnification ratio of 1/n (n=an integer).

11. An image forming apparatus comprising:

means for scanning an image on an original document;

first storing means for storing image data of the image scanned by said scanning means;

second storing means for storing an attribute information corresponding to the image data stored in the first storing means;

means for searching the image data stored in the first storing means based on the attribute information stored in the second storing means and for outputting the searched image data;

means for executing an image edit process of the image data scanned by the scanning means and the image data searched from the first storing means;

means for designating a first edit process for the image data scanned by the scanning means and a second edit process for the image data searched from the first storing means, with respect to the image edit process executed by the execution means, when the scanning means scans the image; and control means for executing the first edit process of the image data scanned by the scanning means by means of the executing means to store the processed image data in the first storing means, in accordance with the edit process designated by the designating means, and for adding the content of the second edit process to the attribute information and storing the attribute information in the second storing means.

* * * * *